United States Patent
Natsuhara et al.

(10) Patent No.: US 12,047,026 B2
(45) Date of Patent: Jul. 23, 2024

(54) CONTROLLER FOR AC ROTARY MACHINE

(71) Applicant: Mitsubishi Electric Corporation, Tokyo (JP)

(72) Inventors: Hiroya Natsuhara, Tokyo (JP); Isao Kezobo, Tokyo (JP); Tatsuya Mori, Tokyo (JP); Kenta Tanaka, Tokyo (JP); Yusuke Takarada, Tokyo (JP); Yuya Takeuchi, Hyogo (JP); Atsushi Ito, Hyogo (JP); Mamoru Shiraki, Hyogo (JP)

(73) Assignee: Mitsubishi Electric Corporation, Tokyo (JP)

( * ) Notice: Subject to any disclaimer, the term of this patent is extended or adjusted under 35 U.S.C. 154(b) by 122 days.

(21) Appl. No.: 17/919,397

(22) PCT Filed: May 13, 2020

(86) PCT No.: PCT/JP2020/019057
§ 371 (c)(1),
(2) Date: Oct. 17, 2022

(87) PCT Pub. No.: WO2021/229703
PCT Pub. Date: Nov. 18, 2021

(65) Prior Publication Data
US 2023/0163712 A1 May 25, 2023

(51) Int. Cl.
*H02P 29/028* (2016.01)
*H02P 27/08* (2006.01)

(52) U.S. Cl.
CPC .......... *H02P 29/028* (2013.01); *H02P 27/085* (2013.01)

(58) Field of Classification Search
CPC ........ H02P 27/08; H02P 21/22; H02P 27/085; H02P 3/22; H02P 27/06; H02P 29/027;
(Continued)

(56) References Cited

U.S. PATENT DOCUMENTS

| 2009/0021207 A1 | 1/2009 | Kezobo et al. |
| 2012/0326644 A1 | 12/2012 | Okumura et al. |
| 2016/0134212 A1* | 5/2016 | Kikuchi .................. H02P 27/06 318/400.21 |

FOREIGN PATENT DOCUMENTS

| JP | 2006-158182 A | 6/2006 |
| JP | 2009-118633 A | 5/2009 |

(Continued)

OTHER PUBLICATIONS

Communication dated May 31, 2023 issued by the European Patent Office in application No. 20935343.2.
(Continued)

*Primary Examiner* — Antony M Paul
(74) *Attorney, Agent, or Firm* — Sughrue Mion, PLLC; Richard C. Turner

(57) ABSTRACT

To provide a controller for AC rotary machine which can detect current of the normal phase certainly when the short circuit failure of one phase occurs, in an apparatus that a current sensor is connected in series to the positive electrode side switching device or the negative electrode side switching device of an inverter. A controller for AC rotary machine, when determining that the short circuit failure of any one phase occurred, calculates voltage command values of normal n−1 phases, and changes the voltage command values of the normal n−1 phases so that on period of the detection object device of each phase of the normal n−1 phases become longer than or equal to a length necessary for current detection at least at a current detection timing.

13 Claims, 14 Drawing Sheets

(58) Field of Classification Search
CPC ........ H02P 25/18; H02P 29/028; H02P 25/22; H02P 2207/05; H02P 25/022; H02P 29/024; H02P 9/305; H02P 21/14; H02P 6/28; H02P 3/12; H02P 6/08; H02P 6/12; H02P 6/32; H02P 7/29; H02P 9/00; H02P 11/00; H02P 11/06; H02P 21/00; H02P 23/07; H02P 23/28; H02P 27/04; H02M 1/0009; H02M 7/5387; H02M 1/4233; B62D 5/0484; B62D 5/046; B62D 5/0463; B62D 6/00; B62D 15/021

See application file for complete search history.

(56) References Cited

FOREIGN PATENT DOCUMENTS

| | | |
|---|---|---|
| JP | 2010-041846 A | 2/2010 |
| JP | 4772116 B2 | 9/2011 |
| JP | 5720963 B2 | 5/2015 |
| JP | 2016-103899 A | 6/2016 |

OTHER PUBLICATIONS

Office Action dated Mar. 22, 2023 from the Japanese Patent Office in JP Application No. 2022-522155.

International Search Report for PCT/JP2020/019057, dated Jul. 21, 2020.

\* cited by examiner

CONTROLLER FOR AC ROTARY MACHINE

CROSS REFERENCE TO RELATED APPLICATIONS

This application is a National Stage of International Application No. PCT/JP2020/019057 filed May 13, 2020.

TECHNICAL FIELD

The present disclosure relates to a controller for AC rotary machine.

BACKGROUND ART

The inverter of the AC rotary machine is provided with switching devices, such as FET (Field Effect Transistor). The patent document 1 and the patent document 2 disclose the technology that the AC rotary machine is operated using the normal phase in which failure does not occur, when the short circuit of the switching device, or the power short circuit or the ground short circuit of the connection terminal of winding of the AC rotary machine occurs.

CITATION LIST

Patent Literature

Patent document 1: JP 4772116 B
Patent document 2: JP 5720963 B

SUMMARY OF INVENTION

Technical Problem

Even when the short circuit failure of one phase occurs, it is desired to detect current of the normal phase. For example, by using the current detection value of the normal phase, abnormality of the normal phase can be detected, and the current feedback control can be performed and a desired torque of the AC rotary machine can be outputted.

However, in the case where the current sensor is connected in series to the positive electrode side switching device or the negative electrode side switching device of the inverter, it is necessary to turn on the positive electrode side switching device or the negative electrode side switching device to which the current sensor is connected in series, for the predetermined period or more, in order to detect current. Especially, when the short circuit failure occurs, a peculiar on/off control of switching device is performed. Accordingly, unless a special control for detecting current is performed, current of the normal phase may be undetectable.

However, the patent document 1 does not disclose a technology for detecting current at the time of occurrence of the short circuit failure. In the technology of the patent document 2, the current sensor is provided in the connection path between the inverter and the winding, it is not necessary to turn on the switching device in order to detect current of the normal phase, and a technology for detecting current is not disclosed.

Then, the purpose of the present disclosure is to provide a controller for AC rotary machine which can detect current of the normal phase certainly when the short circuit failure of one phase occurs, in an apparatus that a current sensor is connected in series to the positive electrode side switching device or the negative electrode side switching device of an inverter.

Solution to Problem

A controller for AC rotary machine according to the present disclosure that controls an AC rotary machine which is provided with n-phase windings (n is a natural number of greater than or equal to three), the controller for AC rotary machine including:

an inverter that is provided with n sets of series circuits in each of which a positive electrode side switching device connected to a positive electrode side of a DC power source and a negative electrode side switching device connected to a negative electrode side of the DC power source are connected in series and a connection node of series connection is connected to the winding of the corresponding phase, corresponding to each phase of n-phase;

n-phase current sensors each of which is connected in series to a detection object device which is the positive electrode side switching device or the negative electrode side switching device of each phase of n-phase, and detects current;

a voltage command value calculation unit that calculates a voltage command value of each phase applied to the winding of each phase;

a PWM control unit that controls on/off the switching devices of each phase by PWM control, based on the voltage command value of each phase;

a current detection unit that detects current of each phase, based on an output signal of the current sensor of each phase, at a timing when the detection object device of each phase is turned on; and a failure determination unit that determines a positive electrode side short circuit failure which is a short circuit failure of a part of the positive electrode side switching device, and a negative electrode side short circuit failure which is a short circuit failure of a part of the negative electrode side switching device, in the series circuit of each phase of the inverter, wherein, when it is determined that the positive electrode side short circuit failure or the negative electrode side short circuit failure of the series circuit of any one phase occurred, the voltage command value calculation unit calculates the voltage command values of normal n−1 phases that the short circuit failure does not occur; and changes the voltage command values of the normal n−1 phases so that on period of the detection object device of each phase of the normal n−1 phases become longer than or equal to a length necessary for current detection at least at a current detection timing.

Advantage of Invention

According to the controller for AC rotary machine of the present disclosure, when the short circuit failure of one phase occurs, the voltage command values of the normal n−1 phases are calculated, and the AC rotary machine can be operated. At this time, even when the voltage command values of the normal n−1 phases that current cannot be detected are calculated, the voltage command values of the normal n−1 phases are changed so that the on period of the detection object devices of the normal n−1 phases become longer than or equal to the length necessary for current detection at a current detection timing. Accordingly, currents of the normal two phases can be detected.

DETAILED DESCRIPTION OF THE EMBODIMENTS

1. Embodiment 1

Figure 1:
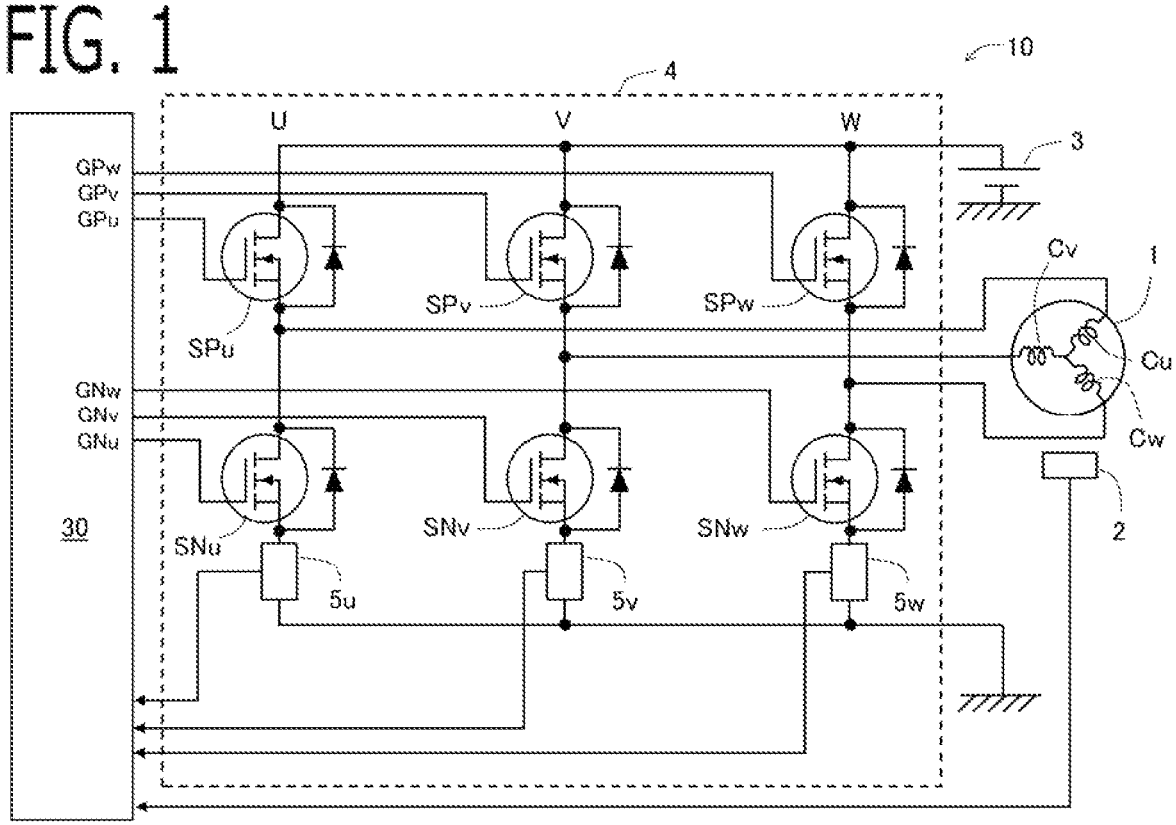
FIG. 1 is a schematic configuration diagram of the AC rotary machine and the controller for AC rotary machine according to Embodiment 1.

A controller for AC rotary machine 10 (hereinafter, referred to simply as the controller 10) according to Embodiment 1 will be explained with reference to drawings. FIG. 1 is a schematic configuration diagram of the AC rotary machine 1 and the controller 10 according to the present embodiment.

1-1. AC Rotary Machine 1

The AC rotary machine 1 is provided with n-phase windings (n is a natural number of greater than or equal to three). In the present embodiment, the AC rotary machine 1 is provided with three-phase windings Cu, Cv, Cw of U phase, V phase, and W phase. The AC rotary machine 1 is provided with a stator and a rotor disposed on the radial-direction inner side of the stator. The three-phase windings Cu, Cv, Cw are wound around the stator. In the present embodiment, the AC rotary machine 1 is the permanent magnet type synchronous rotary machine in which the permanent magnet is provided in the rotor. The AC rotary machine 1 may be the field winding type synchronous rotary machine in which the field winding is provided in the rotor, or it may be the induction machine in which the permanent magnet is not provided in the rotor. The three-phase windings may be connected by star connection, or may be connected by Δ connection.

The rotor is provided with a rotation sensor 2 for detecting a rotational angle of the rotor. Resolver, encoder, or MR sensor is used for the rotation sensor 2. An output signal of the rotation sensor 2 is inputted into the control device 30.

1-2. Inverter 4

The inverter 4 is provided with three sets of series circuits (leg) in each of which a positive electrode side switching device SP connected to a positive electrode side of the DC power source 3 and a negative electrode side switching device SN connected to a negative electrode side of the DC power source 3 are connected in series, corresponding to each phase of three-phase. A connection node of two switching devices in the series circuit of each phase is connected to the winding of the corresponding phase.

Specifically, in the series circuit of U phase, the positive electrode side switching device SPu of U phase and the negative electrode side switching device SNu of U phase are connected in series, and the connection node of two switching devices is connected to the winding Cu of U phase. In the series circuit of V phase, the positive electrode side switching device SPv of V phase and the negative electrode side switching device SNv of V phase are connected in series, and the connection node of two switching devices is connected to the winding Cv of V phase. In the series circuit of W phase, the positive electrode side switching device SPw of W phase and the negative electrode side switching device SNw of W phase are connected in series, and the connection node of two switching devices is connected to the winding Cw of W phase.

FET (Field Effect Transistor) in which a diode is connected in reversely parallel, IGBT (Insulated Gate Bipolar Transistor) in which a diode is connected in reversely parallel, MOSFET (Metal Oxide Semiconductor Field Effect Transistor), bipolar transistor in which a diode is connected in reversely parallel, or the like is used for the switching devices. A gate terminal of each switching device is connected to the control device 30 via a gate drive circuit and the like. The each switching device is turned on or turned off by the switching signals GPu to GNw outputted from the control device 30.

The DC power source 3 outputs a DC voltage Vdc to the inverter 4. The DC power source 3 may be any apparatus which outputs DC voltage, such as a battery, a DC-DC converter, a diode rectifier, and a PWM rectifier. A voltage sensor which detects the DC voltage Vdc of the DC power source 3 may be provided in the DC power source 3, and an output signal of the voltage sensor may be inputted into the control device 30. The control device 30 may control using the detected DC voltage Vdc.

1-3. Current Sensor 5

Three-phase current sensors 5u, 5v, 5w each of which is connected in series to a detection object device which is the positive electrode side switching device SP or the negative electrode side switching device SN of each phase of three-phase, and detects current are provided. In the present embodiment, the detection object device is the negative electrode side switching device SN, and the current sensor 5 of each phase is connected in series to the negative electrode side of the negative electrode side switching device SN of each phase. The current sensor 5 of each phase may be connected in series to the positive electrode side of the negative electrode side switching device SN. Accordingly, the current sensor 5 of each phase can detect current which flows through the negative electrode side switching device SN of each phase.

Specifically, the current sensor 5u of U phase is connected in series to the negative electrode side of the negative electrode side switching device SNu of U phase. The current sensor 5v of V phase is connected in series to the negative electrode side of the negative electrode side switching device SNv of V phase. The current sensor 5w of W phase is connected in series to the negative electrode side of the negative electrode side switching device SNw of W phase. A shunt resistance is used for the current sensor 5 of each phase. A Hall element or CT (Current Transformer) may be used. A signal of the current sensor 5 of each phase is inputted into the control device 30.

1-4. Control Device 30

Figure 2:
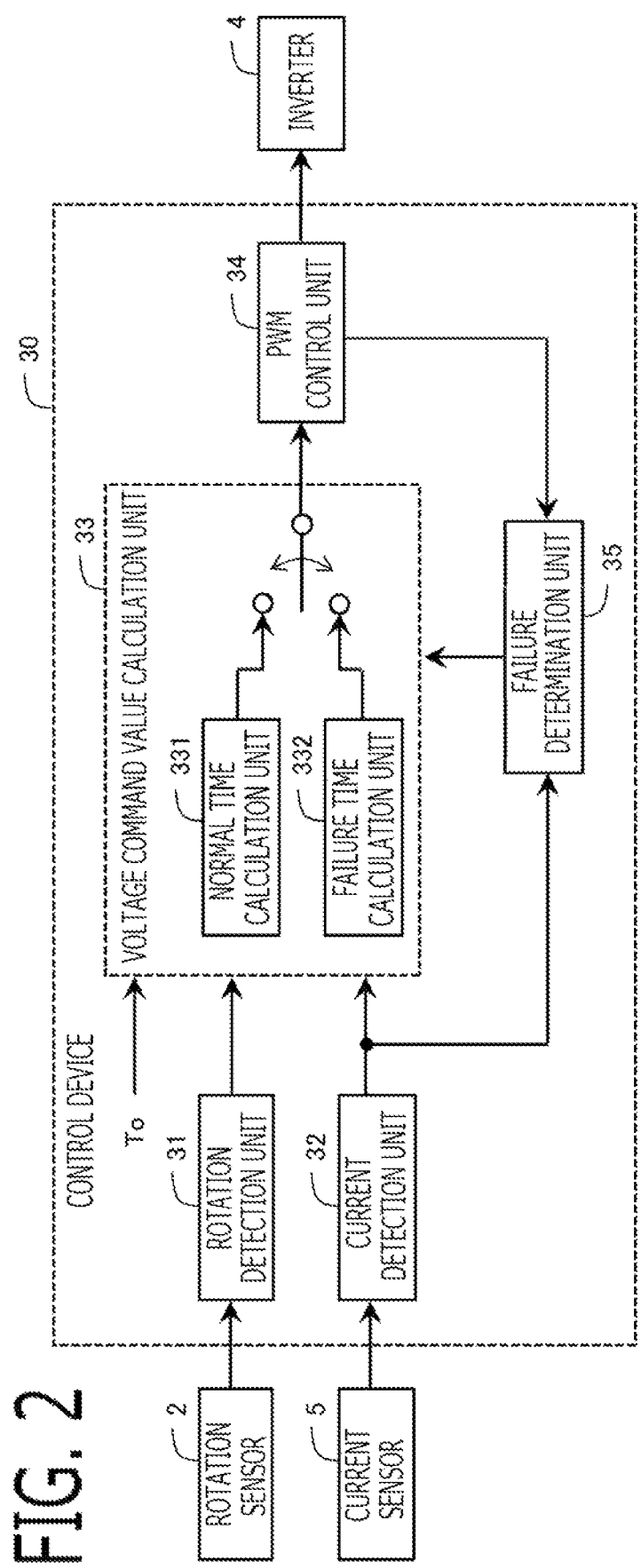
FIG. 2 is a schematic block diagram of the controller according to Embodiment 1.
Figure 3:
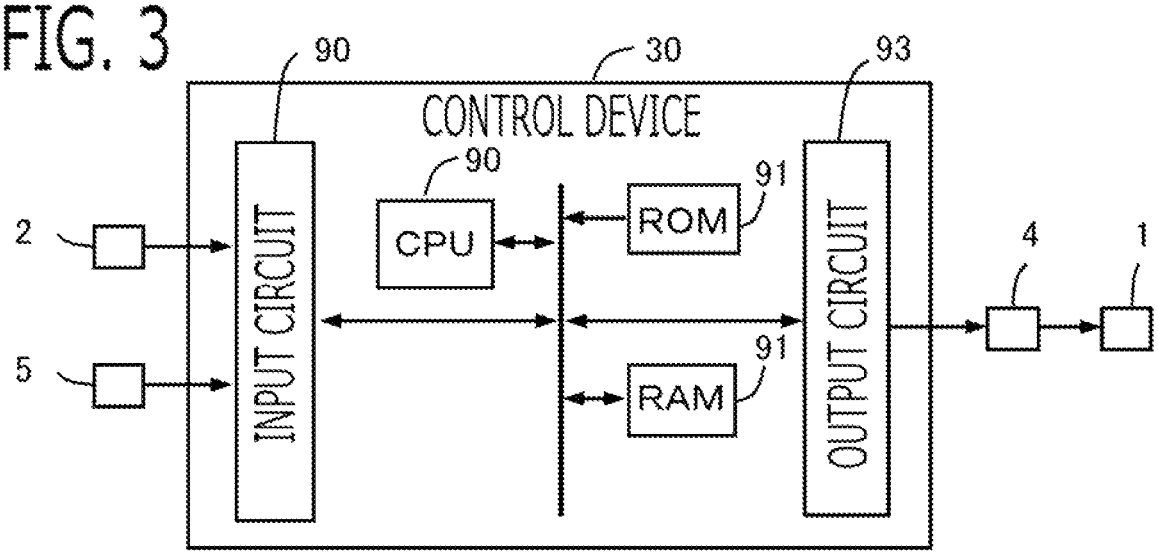
FIG. 3 is a hardware configuration diagram of the controller according to Embodiment 1.

The control device 30 controls the AC rotary machine 1 via the inverter 4. As shown in FIG. 2, the control device 30 is provided with a rotation detection unit 31, a current detection unit 32, a voltage command value calculation unit 33, a PWM control unit 34, a failure determination unit 35, and the like. Respective functions of the control device 30 are realized by processing circuits provided in the control device 30. Specifically, as shown in FIG. 3, the control device 30 is provided, as processing circuits, with an arithmetic processor (computer) 90 such as a CPU (Central Processing Unit), storage apparatuses 91 which exchange data with the arithmetic processor 90, an input circuit 92 which inputs external signals to the arithmetic processor 90, an output circuit 93 which outputs signals from the arithmetic processor 90 to the outside, and the like.

As the arithmetic processor 90, ASIC (Application Specific Integrated Circuit), IC (Integrated Circuit), DSP (Digital Signal Processor), FPGA (Field Programmable Gate Array), various kinds of logical circuits, various kinds of signal processing circuits, and the like may be provided. As the arithmetic processor 90, a plurality of the same type ones or the different type ones may be provided, and each processing may be shared and executed. As the storage apparatuses 91, a RAM (Random Access Memory) which can read data and write data from the arithmetic processor 90, a ROM (Read Only Memory) which can read data from the arithmetic processor 90, and the like are provided. The input circuit 92 is connected with various kinds of sensors and switches such as the rotation sensor 2 and the current sensor 5, and is provided with A/D converter and the like for inputting output signals from the sensors and the switches to the arithmetic processor 90. The output circuit 93 is connected with electric loads such as a gate drive circuit which drive on/off of the switching devices, and is provided with a driving circuit and the like for outputting a control signal from the arithmetic processor 90.

Then, the arithmetic processor 90 runs software items (programs) stored in the storage apparatus 91 such as a ROM and collaborates with other hardware devices in the control device 30, such as the storage apparatus 91, the input circuit 92, and the output circuit 93, so that the respective functions of the control units 31 to 35 of FIG. 2 provided in the control device 30 are realized. Setting data items such as the voltage command value at failure to be used in the control units 31 to 35 are stored, as part of software items (programs), in the storage apparatus 91 such as a ROM. Each function of the control device 30 will be described in detail below.

1-4-1. Rotation Detection Unit 31

The rotation detection unit 31 detects a magnetic pole position θ (a rotational angle θ of the rotor) and a rotational angle speed co of the rotor in an electrical angle. In the present embodiment, the rotation detection unit 31 detects the magnetic pole position θ (the rotational angle θ) and the rotational angle speed co of the rotor, based on the output signal of the rotation sensor 2. The magnetic pole position is set in the direction of the N pole of the permanent magnet provided in the rotor. The rotation detection unit 31 may estimate the rotational angle (the magnetic pole position) without using the rotation sensor, based on current information which are obtained by superimposing a harmonic wave component on the current command value (so-called, sensorless system).

1-4-2. Current Detection Unit 32

The current detection unit 32 detects currents Iu, Iv, Iw which flow into respective phases of the three-phase windings, based on the output signal of the current sensor 5. The current detection unit 32 detects current Iu which flows into the winding of U phase based on the output signal of the current sensor 5u of U phase; detects current Iv which flows into the winding of V phase based on the output signal of the current sensor 5v of V phase; and detects current Iw which flows into the winding of W phase based on the output signal of the current sensor 5w of W phase.

In the present embodiment, the current sensor 5 is connected in series to the negative electrode side switching device SN. The current detection unit 32 detects current at the timing when the negative electrode side switching device SN is turned on. In the present embodiment, the current detection unit 32 detects current at the timing of every PWM period when a carrier wave CA describes below becomes a peak point of mountain. The current detection unit 32 holds the detected current detection value of each phase until next current detection timing.

1-4-3. Failure Determination Unit 35

The failure determination unit 35 determines a positive electrode side short circuit failure which is a short circuit failure of a part of the positive electrode side switching device, and a negative electrode side short circuit failure which is a short circuit failure of a part of the negative electrode side switching device, in the series circuit of each phase of the inverter 4.

The failure determination unit 35 determines, about each phase, that the positive electrode side short circuit failure occurred, when determining that a short circuit failure in which the positive electrode side switching device always turns on, or a short circuit failure in which a connection path between the series circuit and the winding short-circuits to a positive electrode side of the DC power source occurred. And, the failure determination unit 35 determines, about each phase, that the negative electrode side short circuit failure occurred, when determining that a short circuit failure in which the negative electrode side switching device always turns on, or a short circuit failure in which a connection path between the series circuit and the winding short-circuits to a negative electrode side of the DC power source occurred.

For example, the failure determination unit 35 determines occurrence of the positive electrode side short circuit failure and the negative electrode side short circuit failure of each phase, based on on-off pattern of the positive electrode side and the negative electrode side switching devices of each phase, and the current detection value of each phase. For example, the failure determination units 35 determines that the positive electrode side short circuit failure or the negative electrode side short circuit failure corresponding to the on-off pattern occurred, when the current detection value of each phase deviates from a normal range of the current detection value of each phase which is determined based on the on-off pattern of each switching device. Various kinds of well-known methods are used for determination.

If a failure detection circuit which detects failure of each switching device is provided in the drive circuit of each switching device, the failure determination unit 35 may determine the short circuit failure of each switching device, based on the failure detection result by the failure detection circuit.

<Determination of Secondary Failure>

In the present embodiment, when it is determined that the positive electrode side short circuit failure or the negative electrode side short circuit failure of the series circuit of any one phase occurred, the failure determination unit 35 determines failure of the series circuit of each phase of the normal two phases, based on current detection values of the normal two phases. For example, when the current detection values of the normal two phases deviate from the normal ranges of current detection value of respective phases which are determined based on the on-off pattern of each switching device, the failure determination unit 35 determines that the positive electrode side short circuit failure or the negative electrode side short circuit failure corresponding to the on-off pattern occurred.

1-4-4. PWM Control Unit 34

The PWM control unit 34 controls on/off the switching devices of each phase by PWM control (Pulse Width Modulation), based on the voltage command value Vu, Vv, Vw of each phase calculated by the voltage command value calculation unit 33 described below.

Figure 4:
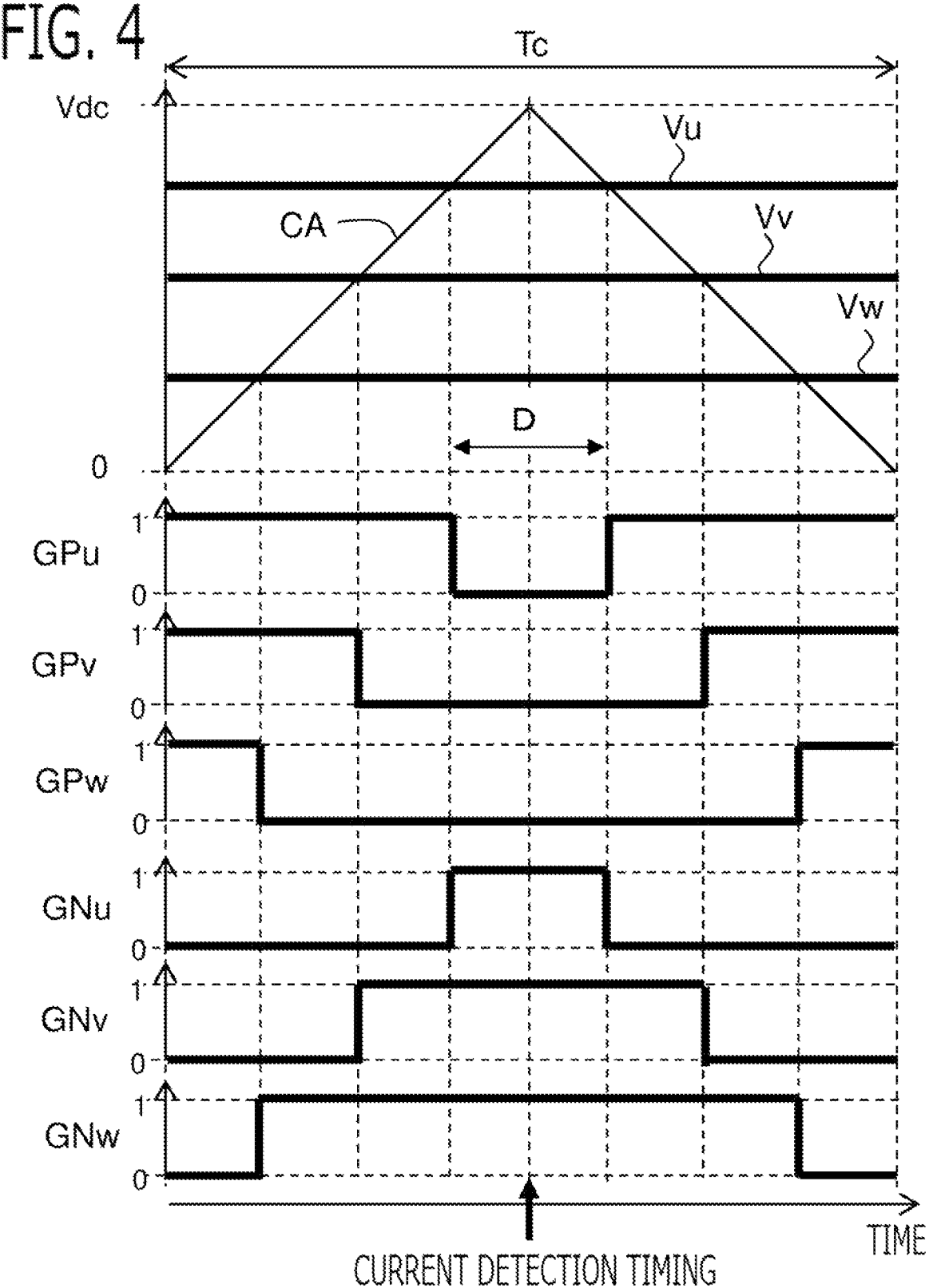
FIG. 4 is a time chart for explaining the PWM control and the current detection timing according to Embodiment 1.

In the present embodiment, as shown in FIG. 4, the PWM control unit 34 compares the voltage command value Vu, Vv, Vw of each phase with a carrier wave CA which vibrates between 0 and the DC voltage Vdc at a control period Tc of the PWM control (hereinafter, referred to as PWM period Tc); and controls on/off the switching devices of each phase, based on a comparison result.

The carrier wave CA is a triangular wave which vibrates between 0 and the DC voltage Vdc at the PWM period Tc. About each phase, the PWM control unit 34 turns on the switching signal GP of the positive electrode side switching device (in this example, 1) and turns on the positive electrode side switching device when the carrier wave CA is less than the voltage command value; and turns off the switching signal GP of the positive electrode side switching device (in this example, 0) and turns off the positive electrode side switching device when the carrier wave CA exceeds the voltage command value. On the other hand, the PWM control unit 34 turns off the switching signal GN of the negative electrode side switching device (in this example, 0) and turns off the negative electrode side switching device when the carrier wave CA is less than the voltage command value; and turns on the switching signal GN of the negative electrode side switching device (in this example, 1) and turns on the negative electrode side switching device when the carrier wave CA exceeds the voltage command value. About each phase, between the on period of the positive electrode side switching device and the on period of the negative electrode side switching device, a short circuit prevention period (dead time) which turns off both of the positive electrode side and the negative electrode side switching device may be provided.

<Upper Limit Value Vup of Voltage Command Value for Current Detection>

As shown in FIG. 4, in the interval D centering on the peak point of mountain of the carrier wave CA, the negative electrode side switching signals GNu, GNv, GNw of all three-phase are turned on. In this interval D, currents which flow into the three-phase windings can be detected by the current sensor 5. In the present embodiment, as mentioned above, the current detection unit 32 detects the currents at the timing of the peak point of mountain of the carrier wave CA.

In order to detect the current of each phase, it is necessary to turn on the negative electrode side switching device of each phase. However, since the negative electrode side switching device always becomes off when the voltage command value coincides with the DC voltage Vdc, current cannot be detected by the current sensor 5.

On the other hand, since the negative electrode side switching device becomes on when the voltage command value is smaller than the DC voltage Vdc, current can be detected by the current sensor. However, since current cannot be detected correctly if the on period of the negative electrode side switching device is too short, it is necessary to set the on period of the negative electrode side switching device longer than or equal to a length necessary for current detection. This is because there is a stabilization time delay Tdly until current which flows through the negative electrode side switching device is stabilized, due to influence of ringing and the like, after turning on the negative electrode side switching device. Accordingly, current cannot be detected correctly, if current is detected before the stabilization time delay Tdly elapses after turning on the negative electrode side switching device.

In the present embodiment, since the center of the on period of the negative electrode side switching device becomes the current detection timing, it is necessary to set the on period of the negative electrode side switching device to a double value of the stabilization time delay Tdly or more. The double value of stabilization time delay Tdly corresponds to the length necessary for current detection. Accordingly, until the on period Ton of the negative electrode side switching device becomes the double value of stabilization time delay Tdly, the voltage command value needs to be decreased by a decrease amount ΔVdwn from the DC voltage Vdc.

In the present embodiment, the decrease amount ΔVdwn and the upper limit value Vup of voltage command value necessary for current detection becomes the next equation. The decrease amount ΔVdwn may be set with a margin considering variation. If the short circuit prevention period mentioned above is provided, the decrease amount ΔVdwn is set considering the short circuit prevention period.

$$Ton = Tdly \times 2$$

$$\Delta Vdwn = Ton/Tc \times Vdc$$

$$Vup = Vdc - \Delta Vdwn \quad (1)$$

For example, if the on period Ton of the negative electrode side switching device necessary for current detection is 5 microseconds and the PWM period Tc is 50 microseconds, the decrease amount ΔVdwn becomes 10% of the DC voltage Vdc, and the upper limit value Vup is set to 90% of the DC voltage Vdc.

In the case where failure is not determined by the failure determination unit 35, even when the voltage command value of one phase becomes larger than the upper limit value Vup and the current of its phase cannot be detected, the voltage command value of the remaining two phases becomes less than or equal to the upper limit value Vup usually. Accordingly, by utilizing Kirchhoff's law that a total value of currents of three-phase becomes 0, the current of one phase can be calculated from the current detection values of two phases. Alternatively, by adding modulation to the voltage command values of three-phase so that the voltage command values do not become larger than the upper limit value Vup, the currents of three-phase can be detected.

In the case where failure is determined by the failure determination unit 35, it is necessary to set the voltage command values of the normal two phases to the upper limit value Vup or less, and detect current.

1-4-5. Voltage Command Value Calculation Unit 33

The voltage command value calculation unit 33 calculates the voltage command value of each phase applied to the winding of each phase. The voltage command value calculation unit 33 is provided with a normal time calculation unit 331 that calculates the voltage command values when failure is not determined by the failure determination unit 35, and a failure time calculation unit 332 that calculates the voltage command values when failure is determined by the failure determination unit 35.

1-4-5-1. Normal Time Calculation Unit 331

The normal time calculation unit 331 calculates the voltage command value of each phase, when failure is not determined by the failure determination unit 35. The normal time calculation unit 331 calculates the voltage command values of three-phase Vu, Vv, Vw by well-known vector control. The normal time calculation unit 331 converts the current detection values of three-phase into current detection values of d-axis and q-axis Id, Iq based on the rotational angle $\theta$; changes the voltage command values of d-axis and q-axis Vd, Vq so that the current detection values of d-axis and q-axis Id, Iq approach the current command values of d-axis and q-axis Ido, Iqo, respectively; and converts the voltage command values of d-axis and q-axis Vd, Vq into the voltage command values of three-phase Vu, Vv, Vw based on the rotational angle $\theta$. Modulation may be added to the voltage command values of three-phase Vu, Vv, Vw. In the present embodiment, the voltage command values of three-phase Vu, Vv, Vw are calculated so as to vibrate within a range from 0 to the DC voltage Vdc. The normal time calculation unit 331 sets the current command values of d-axis and q-axis Ido, Iqo, using the method of various kinds of vector control, based on the torque command value To.

1-4-5-2. Failure Time Calculation Unit 332

The failure time calculation unit 332 calculates the voltage command value of each phase, when failure is determined by the failure determination unit 35. When it is determined that the positive electrode side short circuit failure or the negative electrode side short circuit failure of the series circuit of any one phase occurred, the failure time calculation unit 332 calculates the voltage command values of the normal two phases that the short circuit failure do not occur.

If the positive electrode side switching devices of three-phase or the negative electrode side switching devices of three-phase are turned on at the time of failure like patent document 1, the three-phase windings are mutually short-circuited, a brake torque is generated, and an adverse influence is given on a power apparatus to which torque of the AC rotary machine 1 is outputted. Then, in the present embodiment, the voltage command values of the normal two phases which do not generate the brake torque are calculated.

If a failure part is turned out, an induction current which becomes a source of the brake torque can be calculated from the rotational angle $\theta$ and the rotational angle speed $\omega$. Accordingly, based on at least the rotational angle $\theta$, the voltage command values which suppress generation of the brake torque and generates the torque close to the torque command value To can be calculated.

<Calculation of Voltage Command Values at the Time of Failure>

Figure 6:
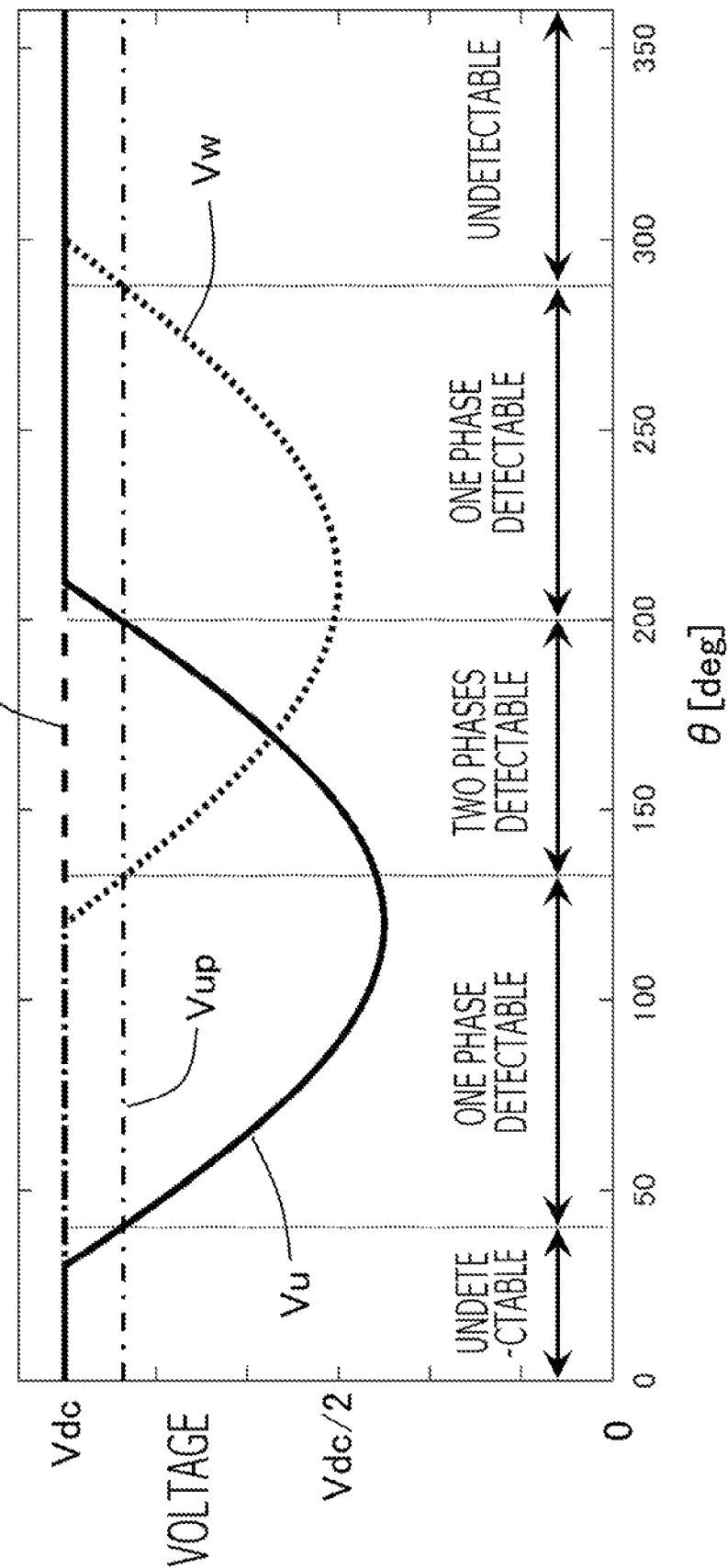
FIG. 6 is a time chart for explaining calculation of the voltage command values at occurrence of the positive electrode side short circuit failure of V phase according to Embodiment 1.
Figure 7:
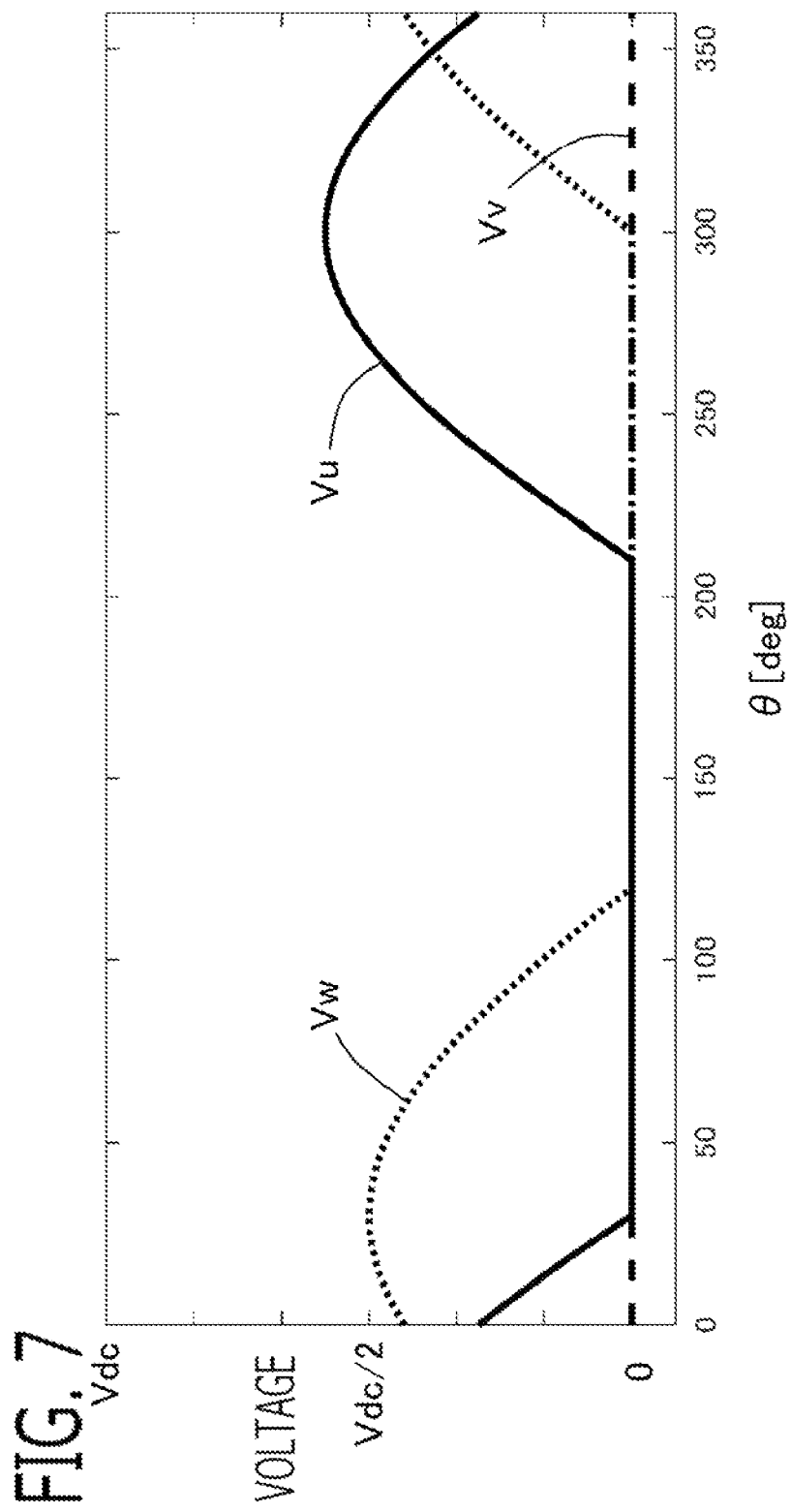
FIG. 7 is a time chart for explaining calculation of the voltage command values at occurrence of the negative electrode side short circuit failure of V phase according to Embodiment 1.

When it is determined that the positive electrode side short circuit failure occurred, as shown in FIG. 6, the failure time calculation unit 332 sets the voltage command value of the abnormal phase in which the short circuit failure occurred, to the DC voltage Vdc; and calculates the voltage command values of the normal two phases which vibrate on a basis of the DC voltage Vdc according to the rotational angle $\theta$. On the other hand, when it is determined that the negative electrode side short circuit failure occurred, as shown in FIG. 7, the failure time calculation unit 332 sets the voltage command value of the abnormal phase in which the short circuit failure occurred, to 0; and calculates the voltage command values of the normal two phases which vibrate on a basis of 0 according to the rotational angle $\theta$.

In the present embodiment, the failure time calculation unit 332 calculates basic values of voltage command value of the normal two phases which vibrate on a basis of a half value of the DC voltage Vdc; and makes the basic values of voltage command value of the normal two phases offset by the half value of the DC voltage Vd in a positive side or a negative side, according to the positive electrode side short circuit failure or the negative electrode side short circuit failure. The details will be explained below.

<Calculation of Basic Values of Voltage Command Value>

Figure 5:
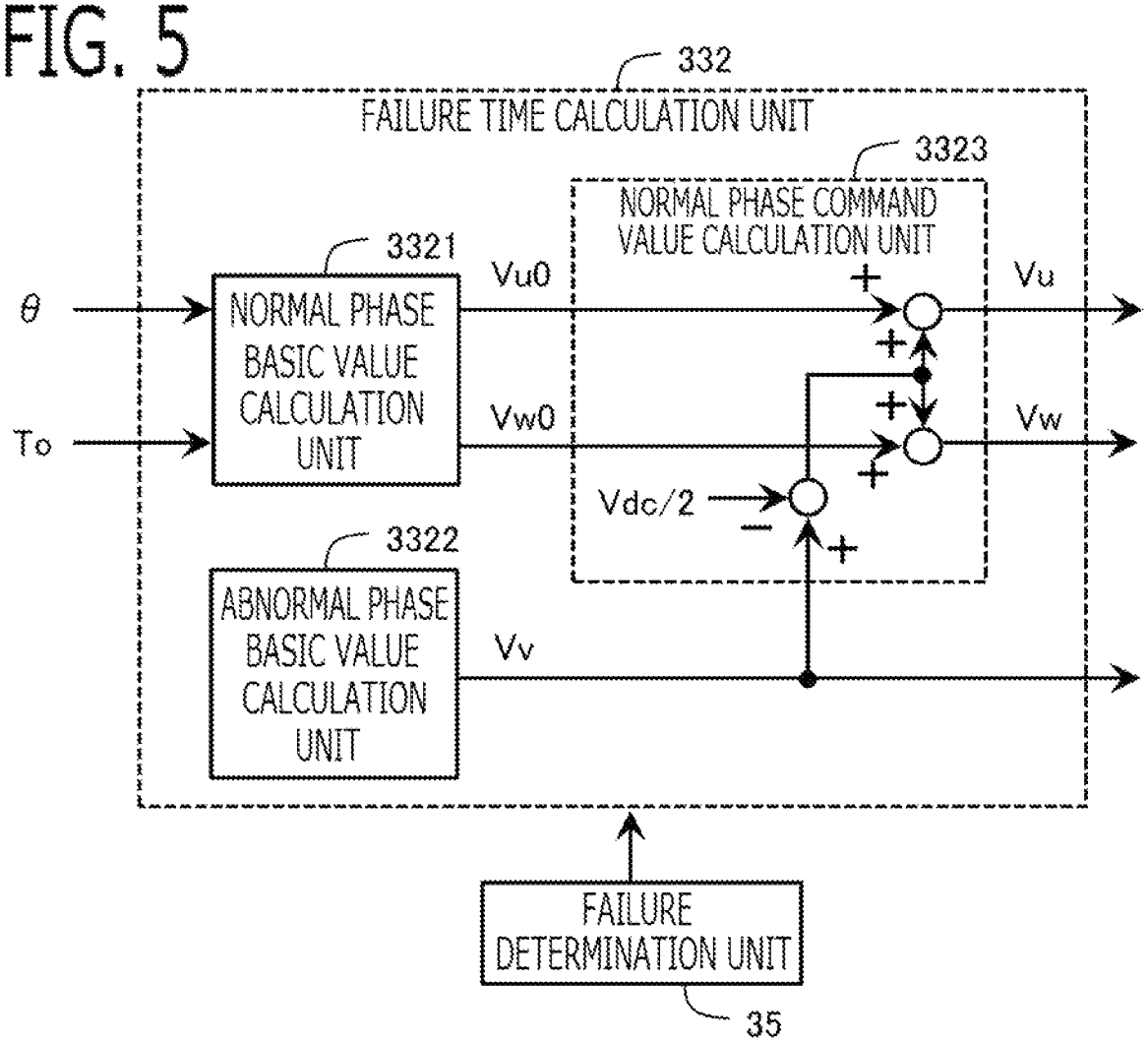
FIG. 5 is a block diagram of the failure time calculation unit at occurrence of the short circuit failure of V phase according to Embodiment 1.

FIG. 5 shows a control block diagram indicating processing when the positive electrode side short circuit failure or the negative electrode side short circuit failure of V phase occurs. The failure time calculation unit 332 is provided with a normal phase basic value calculation unit 3321, an abnormal phase command value calculation unit 3322, and a normal phase command value calculation unit 3323.

The normal phase basic value calculation unit 3321 calculates the basic values of voltage command value of the normal two phases which vibrate on the basis of the half value of the DC voltage Vdc according to the rotational angle $\theta$. For example, by referring to a basic value setting data in which a relationship between the rotational angle $\theta$ and the voltage command values of the normal two phases is preliminarily set, the normal phase basic value calculation unit 3321 calculates the basic values of voltage command value of the normal two phases corresponding to the present rotational angle $\theta$. The basic value setting data is preliminarily set for each of a plurality of the rotational angle speeds $\omega$, and the basic value setting data corresponding to the present rotational angle speed $\omega$ is used. An arithmetic expression may be used instead of the basic value setting data.

The basic value setting data is set for each combination of the normal two phases. For example, when U phase fails, the basic value setting data of V phase and W phase in which a relationship between the rotational angle $\theta$ and the voltage command values of V phase and W phase is preliminarily set is referred. When V phase fails, the basic value setting data of U phase and W phase in which a relationship between the rotational angle $\theta$ and the voltage command values of U phase and W phase is preliminarily set is referred. When W phase fails, the basic value setting data of U phase and V phase in which a relationship between the rotational angle $\theta$ and the voltage command values of U phase and V phase is preliminarily set is referred.

The normal phase basic value calculation unit 3321 increases or decreases amplitudes of the basic values of voltage command value of the normal two phases, centering on the half value of the DC voltage Vdc, according to the torque command value To. The torque command value To may be calculated inside the control device 30, or may be transmitted from the outside of the control device 30. As the torque command value To, a torque current command value which is a current command value corresponding to torque may be used.

<Setting at Time of Positive Electrode Side Short Circuit Failure>

When it is determined that the positive electrode side short circuit failure occurred, the abnormal phase command value calculation unit 3322 sets the voltage command value of the abnormal phase in which the short circuit failure occurred, to the DC voltage Vdc. Then, the normal phase command value calculation unit 3323 makes the basic values of voltage command value of the normal two phases offset by the half value of the DC voltage Vdc in the positive direction, and calculates the voltage command values of the normal two phases.

FIG. 6 shows calculation example of the voltage command value Vv of abnormal V phase, and the voltage command values Vu, Vw of normal U phase and V phase after offset, when it is determined that the positive electrode side short circuit failure of V phase occurred. The horizontal axis is the rotational angle θ.

In this way, since the voltage command value of the abnormal phase is set to the DC voltage Vdc, the negative electrode side switching device of the abnormal phase is always turned off by the PWM control, the series circuit of the abnormal phase is short-circuited, and a large current can be prevented from flowing. The failure time calculation unit 332 may always turn off the negative electrode side switching device of the abnormal phase, without setting the voltage command value of the abnormal phase and performing the PWM control. The positive electrode side switching device of the abnormal phase may always be turned off on the safe side. In this case, it corresponds that the voltage command value of the abnormal phase is set to the DC voltage Vdc.

If the voltage command values of the normal two phases are different from the voltage command value of the abnormal phase, current flows according to a voltage difference between phases. Since the voltage command value of the abnormal phase is set to the DC voltage Vdc, the voltage difference in the same direction always occurs between the voltage command value of the abnormal phase, and the basic values of voltage command value of the normal two phases which vibrates on the basis of the half value of the DC voltage Vdc, and the current in the same direction flows. Accordingly, it is not desirable. Therefore, by making the basic values of voltage command value of the normal two phases offset by the half value of the DC voltage Vdc in the positive direction like the above configuration, the voltage command values of the normal two phases can be vibrated on the basis of the DC voltage Vdc. Since the applied voltages to the windings are upper-limited by the DC voltage Vdc, the voltage command values of the normal two phases are also upper-limited by the DC voltage Vdc. Although the voltage command values of the normal two phases do not need to be upper-limited by the DC voltage Vdc, since the voltage command values are compared with the carrier wave CA which vibrates between 0 and the DC voltage Vdc, the result of PWM control becomes the same.

Therefore, in a period when the voltage command values of the normal two phases coincide with the DC voltage Vdc which is the same as the voltage command value of the abnormal phase, the voltage difference between phases does not occur, and current can be prevented from flowing according to the voltage difference between phases. On the other hand, in a period when the voltage command values of the normal two phases become smaller than the DC voltage Vdc, current for generating torque according to the torque command value To can be flowed. In the case of making current of one normal phase larger than 0A and making current of the other normal phase smaller than 0A in order to generate the torque according to the torque command value To, the voltage command value of one normal phase may be set to the DC voltage Vdc, and the voltage command value of the other normal phase may be decreased from the DC voltage Vdc. There is also an angle interval where torque cannot be generated according to the torque command value To due to failure. Accordingly, torque can be generated according to the torque command value To as much as possible, while suppressing increase in winding current.

<Setting at Time of Negative Electrode Side Short Circuit Failure>

When it is determined that the negative electrode side short circuit failure occurred, the abnormal phase command value calculation unit 3322 sets the voltage command value of the abnormal phase in which the short circuit failure occurred, to 0. Then, the normal phase command value calculation unit 3323 makes the basic values of voltage command value of the normal two phases offset by the half value of the DC voltage Vdc in the negative direction, and calculates the voltage command values of the normal two phases.

FIG. 7 shows calculation example of the voltage command value Vv of abnormal V phase, and the voltage command values Vu, Vw of normal U phase and V phase after offset, when it is determined that the negative electrode side short circuit failure of V phase occurred. The horizontal axis is the rotational angle θ.

In this way, since the voltage command value of the abnormal phase is set to 0, the positive electrode side switching device of the abnormal phase is always turned off by the PWM control, the series circuit of the abnormal phase is short-circuited, and a large current can be prevented from flowing. The failure time calculation unit 332 may always turn off the positive electrode side switching device of the abnormal phase, without setting the voltage command value of the abnormal phase and performing the PWM control. The negative electrode side switching device of the abnormal phase may always be turned off on the safe side. In this case, it corresponds that the voltage command value of the abnormal phase is set to 0.

If the voltage command values of the normal two phases are different from the voltage command value of the abnormal phase, current flows according to a voltage difference between phases. Since the voltage command value of the abnormal phase is set to 0, the voltage difference in the same direction always occurs between the voltage command value of the abnormal phase, and the basic values of voltage command value of the normal two phases which vibrates on the basis of the half value of the DC voltage Vdc, and the current in the same direction flows. Accordingly, it is not desirable. Therefore, by making the basic values of voltage command value of the normal two phases offset by the half value of the DC voltage Vdc in the negative direction like the above configuration, the voltage command values of the normal two phases can be vibrated on the basis of 0. Since the voltage applied to winding is lower-limited by 0, the voltage command values of the normal two phases are also lower-limited by 0. Although the voltage command values of the normal two phases do not need to be lower-limited by 0, since the voltage command values are compared with the carrier wave CA which vibrates between 0 and the DC voltage Vdc, the result of PWM control becomes the same.

Therefore, in a period when the voltage command values of the normal two phases coincide with 0 which is the same as the voltage command value of the abnormal phase, the voltage difference between phases does not occur, and current can be prevented from flowing according to the voltage difference between phases. On the other hand, in a period when the voltage command values of the normal two phases become larger than 0, current for generating torque according to the torque command value To can be flowed. In the case of making current of one normal phase larger than 0A and making current of the other normal phase smaller than 0A in order to generate the torque according to the torque command value To, the voltage command value of one normal phase may be increased from 0, and the voltage command value of the other normal phase may be set to 0. There is also an angle interval where torque cannot be generated according to the torque command value To due to failure. Accordingly, torque can be generated according to the torque command value To as much as possible, while suppressing increase in winding current.

<Upper Limitation of Voltage Command Values of Normal Two Phases>

At the time of the positive electrode side short circuit failure, as shown in FIG. 6, there is an interval where one or both of the voltage command values of the normal two phases coincide with the DC voltage Vdc. Therefore, the on period of the negative electrode side switching device of the normal two phases becomes short, and it becomes impossible to detect current by the current sensor.

In FIG. 6, there is the angle interval where current of normal one phase or two phases can be detected. But, if the torque command value To becomes small, amplitudes of the voltage command values of the normal two phases become small, and there is no angle interval where current of normal one phase or two phases can be detected, in all angle intervals.

Then, the voltage command calculation unit 332 changes the voltage command values of the normal two phases so that on period of the negative electrode side switching device of each phase of the normal two phases become longer than or equal to a length necessary for current detection at least at a current detection timing.

According to this configuration, when failure of one phase is determined, currents of the normal two phases can be detected. Accordingly, control at failure can be performed using the current detection values of the normal two phases. In the present embodiment, as mentioned above, the failure determination unit 35 can determine failure of the series circuits of the normal two phases using the current detection values of the normal two phases. Accordingly, reliability of operation of the AC rotary machine at the time of failure occurrence can be improved more.

In the present embodiment, the detection object device is the negative electrode side switching device. When it is determined that the short circuit failure occurred, the failure time calculation unit 332 upper-limits the voltage command values of the normal two phases by an upper limit value Vup which is set to a value smaller than the DC voltage Vdc so that the on period of the negative electrode side switching device of each phase of the normal two phases becomes longer than or equal to the length necessary for current detection. The upper limit value Vup is set as explained using the equation (1).

According to this configuration, the on periods of the negative electrode side switching devices of the normal two phases can be set longer than or equal to the length necessary for current detection, currents of the normal two phases can be detected with good accuracy. If the upper limit value Vup is set so that the on period of the negative electrode side switching device becomes the minimum length necessary for current detection, influence on the voltage command values of the normal phases can be minimized, and influence on the current control and the torque control can be suppressed.

In the upper limitation by the upper limit value Vup, only the voltage command value which exceeds the upper limit value Vup may be set to the upper limit value Vup; or the voltage command values of the normal two phases may be decreased by the same offset voltage so that the voltage command values of the normal two phases do not exceed the upper limit value Vup; or a coefficient smaller than one may be multiplied to the voltage command values of the normal two phases.

Figure 8:
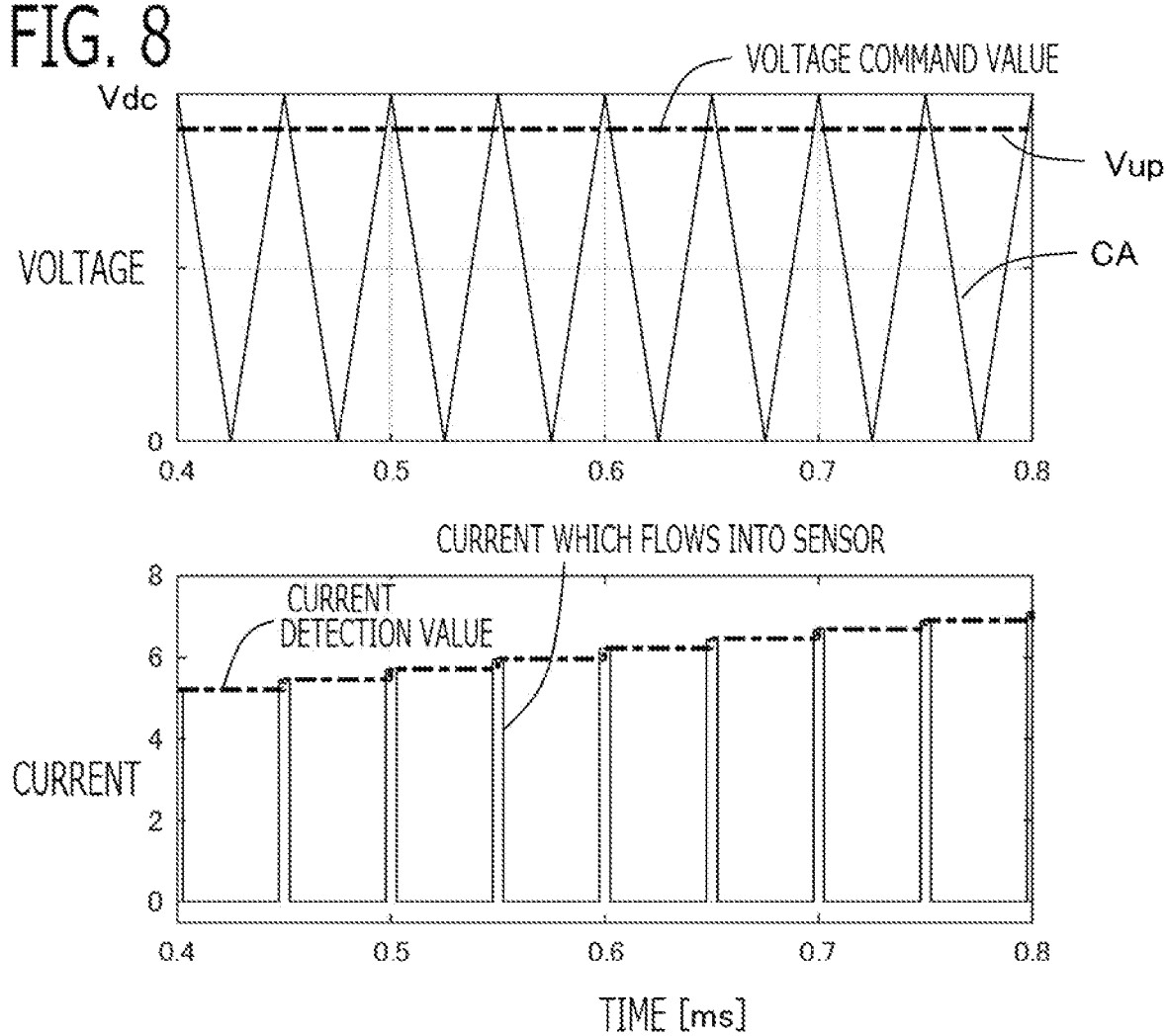
FIG. 8 is a time chart for explaining the upper limitation of voltage command value and the current detection timing according to Embodiment 1.

In the present embodiment, as shown in FIG. 8, it is configured that currents are detected every PWM period Tc, the voltage command values of the normal phases are always upper-limited by the upper limit value Vup which is set to 90% of the DC voltage Vdc. Accordingly, the negative electrode side switching device is turned on at the vicinity of the peak point of mountain of the carrier wave CA of each PWM period Tc, and current flows through the current sensor. In the figure, the behavior until current is stabilized after turning on the switching device is omitted. Current can be detected at the peak point of mountain of the carrier wave CA of each PWM period Tc. The current detection value is held until the next current detection timing.

For the purposes, such as detection of failure of the current sensor, and correction of the output signal of the current sensor, the current detection unit 32 may detect the output signal of the current sensor at the timing when current is not flowing into the current sensor. In this case, when it is determined that the short circuit failure occurred, the failure time calculation unit 332 may lower-limit the voltage command values of the normal two phases by a lower limit value which is set to a value larger than 0 so that the off period of the negative electrode side switching device of each phase of the normal two phases may be generated. Especially, when it is determined that the negative electrode side short circuit failure occurred, since the voltage command values of the normal two phases vibrate on the basis of 0, the frequency of becoming 0 becomes high, and it is necessary to lower-limit by the lower limit value. In the case of lower-limiting by the lower limit value, the current detection unit 32 may detect the output signal of the current sensor at the peak point of valley of the carrier wave CA.

2. Embodiment 2

The controller 10 according to Embodiment 2 will be explained. The explanation for constituent parts the same as those in Embodiment 1 will be omitted. The basic configuration of the AC rotary machine 1 and the controller 10 according to the present embodiment is the same as that of Embodiment 1. Embodiment 2 is different from Embodiment 1 in that the voltage command values are calculated by using the current detection values of the normal two phases at the time of the short circuit failure.

In the present embodiment, when it is determined that the short circuit failure occurred, the voltage command value calculation unit 33 calculates the voltage command values of the normal two phases, based on the current detection values of the normal two phases.

<Calculation of Current Command Values of Normal Two Phases>

Figure 9:
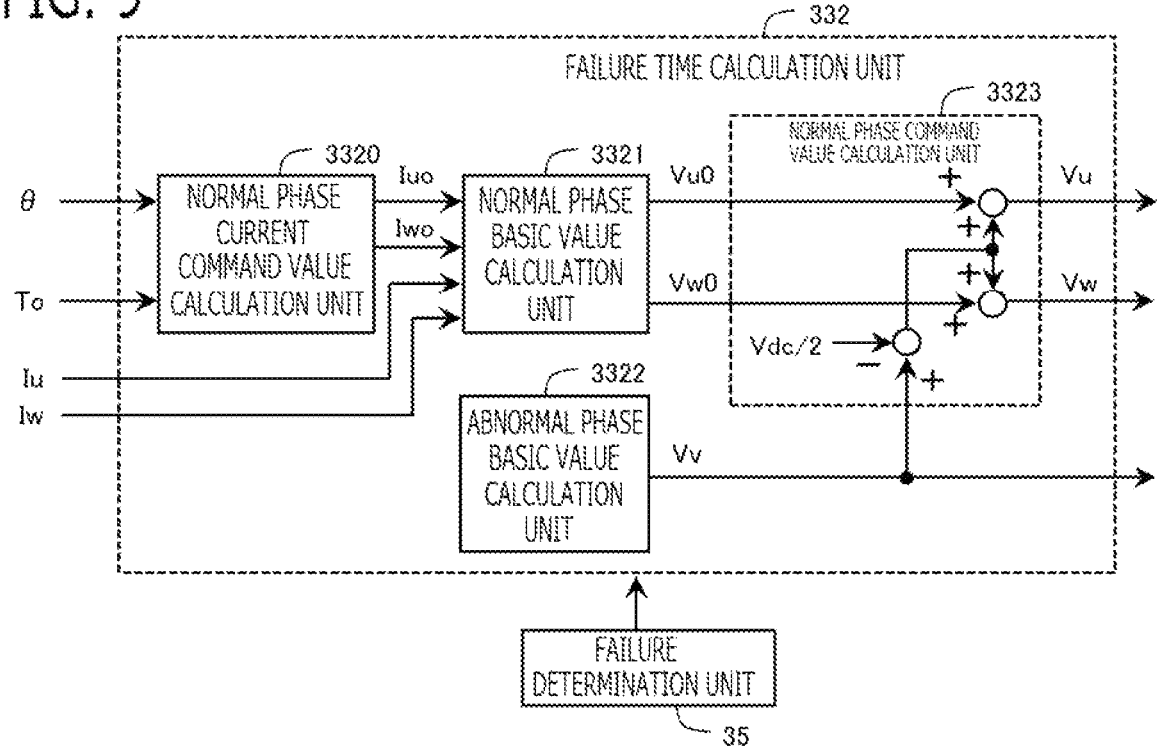
FIG. 9 is a block diagram of the failure time calculation unit at occurrence of the short circuit failure of V phase according to Embodiment 2.

FIG. 9 shows a control block diagram indicating processing when the positive electrode side short circuit failure or the negative electrode side short circuit failure of V phase occurs. It is configured similarly to FIG. 9 of the patent document 2. The failure time calculation unit 332 is provided with a normal phase current command value calculation unit 3320, a normal phase basic value calculation unit 3321, an abnormal phase command value calculation unit 3322, and a normal phase command value calculation unit 3323.

The normal phase current command value calculation unit 3320 calculates the current command values of the normal two phases which vibrate on the basis of 0, according to the rotational angle θ. For example, by referring to a current command value setting data in which a relationship between the rotational angle θ and the current command values of the normal two phases is preliminarily set, the normal phase current command value calculation unit 3320 calculates the current command values of two phases corresponding to the present rotational angle θ. The current command value setting data is preliminarily set for each of a plurality of the rotational angle speeds ω, and the current command value setting data corresponding to the present rotational angle speed ω is used. Instead of the current command value setting data, an arithmetic expression may be used.

The current command value setting data is set for each combination of the normal two phases. For example, when U phase fails, the current command value setting data of V phase and W phase in which a relationship between the rotational angle θ and the current command values of V phase and W phase is preliminarily set is referred. When V phase fails, the current command value setting data of U phase and W phase in which a relationship between the rotational angle θ and the current command values of U phase and W phase is preliminarily set is referred. When W phase fails, the current command value setting data of U phase and V phase in which a relationship between the rotational angle θ and the current command values of U phase and V phase is preliminarily set is referred.

The normal phase current command value calculation unit 3320 increases or decreases the amplitudes of the current command values of the normal two phases centering on 0, according to the torque command value To.

The normal phase basic value calculation unit 3321 performs a current feedback control which changes basic values of voltage command value of the normal two phases so that the current detection values of the normal two phases approach the current command values of the normal two phases, respectively. For example, when V phase fails, the normal phase basic value calculation unit 3321 changes the basic value of voltage command value Vu0 of U phase so that the current detection value of U phase Iu approaches the current command value Iuo of U phase, and changes the basic value of voltage command value Vw0 of W phase so that the current detection value Iw of W phase approaches the current command value Iwo of W phase. PI control based on a current deviation or the like is used.

The basic values of voltage command value of the normal two phases calculated in this way vibrate on the basis of the half value of the DC voltage Vdc according to the rotational angle θ, similarly to Embodiment 1.

<Setting at Positive Electrode Side Short Circuit Failure>

Similarly to Embodiment 1, when it is determined that the positive electrode side short circuit failure occurred, the abnormal phase command value calculation unit 3322 sets the voltage command value of the abnormal phase in which the short circuit failure occurred, to the DC voltage Vdc. And, the normal phase command value calculation unit 3323 makes the basic values of voltage command value of the normal two phases offset by the half value of the DC voltage Vdc in the positive direction, and calculates the voltage command values of the normal two phases.

The voltage command values of the normal two phases of the present embodiment become the similar behavior as FIG. 6 of Embodiment 1. By making the basic values of voltage command value of the normal two phases offset by the half value of the DC voltage Vdc in the positive direction, the voltage command values of the normal two phases can be vibrated on the basis of the DC voltage Vdc. Accordingly, torque can be generated according to the torque command value To as much as possible, while suppressing increase in winding current.

<Setting at Time of Negative Electrode Side Short Circuit Failure>

Similarly to Embodiment 1, when it is determined that the negative electrode side short circuit failure occurred, the abnormal phase command value calculation unit 3322 sets the voltage command value of the abnormal phase in which the short circuit failure occurred, to 0. And, the normal phase command value calculation unit 3323 makes the basic values of voltage command value of the normal two phases offset by the half value of the DC voltage Vdc in the negative direction, and calculates the voltage command values of the normal two phases.

The voltage command values of the normal two phases of the present embodiment become the similar behavior as FIG. 7 of Embodiment 1. By making the basic values of voltage command value of the normal two phases offset by the half value of the DC voltage Vdc in the negative direction, the voltage command values of the normal two phases can be vibrated on the basis of 0. Accordingly, torque can be generated according to the torque command value To as much as possible, while suppressing increase in winding current.

<Upper Limitation of Voltage Command Values of Normal Two Phases>

Similarly to FIG. 6 of Embodiment 1, at the time of the positive electrode side short circuit failure, there is an interval where one or both of the voltage command values of the normal two phases coincide with the DC voltage Vdc. Therefore, the on period of the negative electrode side switching device of the normal two phases becomes short, and it becomes impossible to detect current by the current sensor.

Similarly to Embodiment 1, the voltage command calculation unit 332 changes the voltage command values of the normal two phases so that on period of the negative electrode side switching device of each phase of the normal two phases become longer than or equal to a length necessary for current detection at least at a current detection timing.

According to this configuration, when failure of one phase is determined, currents of the normal two phases can be detected. Accordingly, the current feedback control at failure is performed using the current detection values of the normal two phases, and the voltage command values of the normal two phases can be calculated.

Similarly to Embodiment 1, when it is determined that the short circuit failure occurred, the failure time calculation unit 332 upper-limits the voltage command values of the normal two phases by the upper limit value Vup which is set to a value smaller than the DC voltage Vdc so that the on period of the negative electrode side switching device of each phase of the normal two phases becomes longer than or equal to the length necessary for current detection.

According to this configuration, the on periods of the negative electrode side switching devices of the normal two phases can be set longer than or equal to the length necessary for current detection, and currents of the normal two phases can be detected with good accuracy.

The failure determination unit 35 may determine failure of the series circuits of the normal two phases using the current detection values of the normal two phases similarly to Embodiment 1, or may not determine failure of the series circuits of the normal two phases unlike Embodiment 1.

3. Embodiment 3

The controller 10 according to Embodiment 3 will be explained. The explanation for constituent parts the same as those in Embodiment 1 will be omitted. The basic configuration of the AC rotary machine 1 and the controller 10 according to the present embodiment is the same as that of Embodiment 1. Embodiment 3 is different from Embodiment 1 in that currents are detected for every a plurality of PWM periods, and the voltage command values are changed.

When it is determined that the short circuit failure occurred, the current detection unit 32 detects current for every a plurality of PWM periods. When it is not determined that the short circuit failure occurred, the current detection unit 32 detects current for every PWM period.

Figure 10:
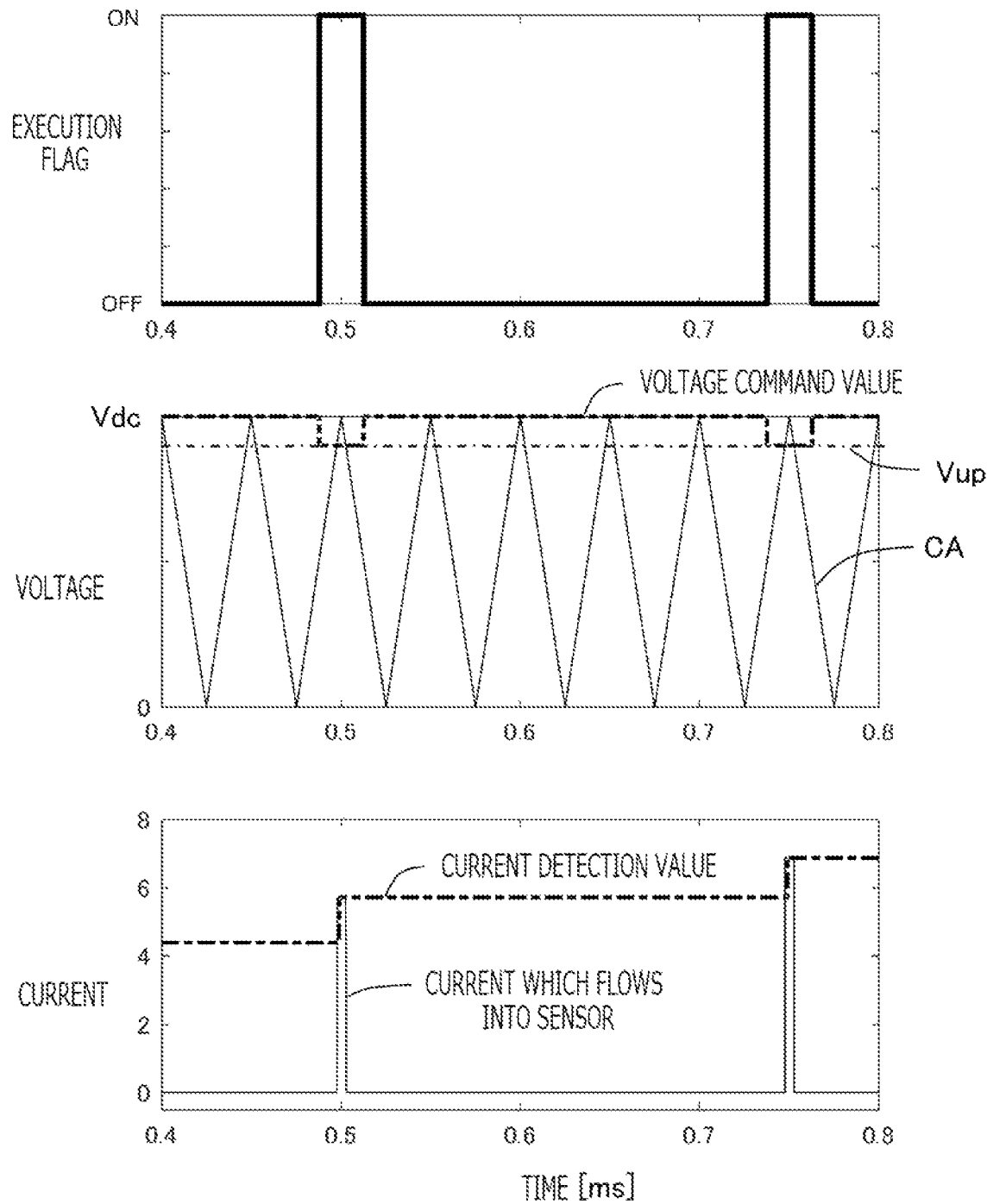
FIG. 10 is a time chart for explaining the upper limitation of voltage command value and the current detection timing according to Embodiment 3.

For example, as shown in the time chart of FIG. 10, the current detection unit 32 detects current at the peak point of mountain of the carrier wave CA of every five PWM periods.

When it is determined that the short circuit failure occurred, the voltage command calculation unit 332 changes the voltage command values of the normal two phases so that the on period of the negative electrode side switching device of each phase of the normal two phases become longer than or equal to the length necessary for current detection at a current detection timing of every the plurality of PWM periods (in this example, every five PWM periods).

The detection object device is the negative electrode side switching device. When it is determined that the short circuit failure occurred, the failure time calculation unit 332 upper-limits the voltage command values of the normal two phases by an upper limit value Vup which is set to a value smaller than the DC voltage Vdc so that the on period of the negative electrode side switching device of each phase of the normal two phases becomes longer than or equal to the length necessary for current detection at the current detection timing of every the plurality of PWM periods.

If the voltage command value is decreased to the upper limit value Vup by the upper limitation, the decrease of torque and the increase of current will occur. According to the above configuration, a frequency where the voltage command value is upper-limited by the upper limit value Vup can be decreased. Accordingly, a frequency of the decrease of torque and the increase of current can be decreased, and an average decrease amount of torque and an average increase amount of current can be decreased according to the frequency. For example, when upper-limiting every five PWM periods, the average decrease amount of torque and the average increase amount of current can be decreased to $1/5$, compared with when upper-limiting every PWM period. When the voltage command value is lower than the upper limit value Vup, since the upper limitation is not performed, the influence of frequency of current detection does not occur.

For example, as shown in the time chart of FIG. 10, the failure time calculation unit 332 turns on an execution flag of limitation of voltage command value at the current detection timing of every five PWM periods. The failure time calculation unit 332 turns on the execution flag during an on period centering on the peak point of mountain of the carrier wave CA which is the current detection timing. The on period of the execution flag is set longer than an on period of the negative electrode side switching device corresponding to the upper limit value Vup.

Then, when the execution flag is turned on, the failure time calculation unit 332 upper-limits the voltage command values of the normal two phases by the upper limit value Vup. FIG. 10 shows the voltage command value of normal one phase which is set to the DC voltage Vdc. In the on period of the execution flag, the voltage command value is upper-limited by the upper limit value Vup, and the voltage command value is set to the upper limit value Vup. Accordingly, the on period of the negative electrode side switching device becomes longer than or equal to the length necessary for current detection at the current detection timing of every five PWM periods, and current can be detected with good accuracy. The current detection unit 32 holds the detected current detection value of each phase until next current detection timing after five PWM periods.

Using the current detection values of the normal two phases, the failure determination of normal phase explained in Embodiment 1 is performed, and the current feedback control explained in Embodiment 2 is performed.

When the voltage command values of the normal two phases are less than or equal to the upper limit value Vup, the current detection unit 32 may detect current for every PWM period.

In PWM period when current is not detected, the current detection unit 32 may calculate the current detection value, based on a plurality of past current detection values. For example, the current detection unit 32 may calculate the current detection value by performing a prediction such as a first order prediction or a second order prediction, based on the plurality of past current detection values; or may calculate the current detection value by performing a low pass filter processing to the plurality of past current detection values. According to this configuration, In PWM period when current is not detected, the current detection value can be changed smoothly, and can be used for each processing.

<Setting of Sampling Period of Current>

As the sampling period of current becomes long, the average decrease amount of torque and the average increase amount of current can be reduced. However, if the sampling frequency of current decreases, Nyquist frequency decreases. Accordingly, if the sampling period of current becomes long too much, stability of the current feedback control system is deteriorated.

Then, the plurality of PWM periods (the sampling period of current) for detecting current is set shorter than a response time constant of a control system which controls current flowing through the winding. The response time constant is defined as a time after performing step change of the current command value until the current detection value reaches 63.2% of the final value. The response time constant corresponds to a reciprocal of a cutoff frequency of the current feedback control system.

According to this configuration, Since the sampling period of current is set shorter than the response time constant, the current feedback control system can be prevented from being destabilized.

4. Embodiment 4

The controller 10 according to Embodiment 4 will be explained. The explanation for constituent parts the same as those in Embodiment 1 will be omitted. The basic configuration of the AC rotary machine 1 and the controller 10 according to the present embodiment is the same as that of Embodiment 1. Embodiment 4 is different from Embodiment 1 in that PWM period is lengthened when the short circuit failure occurs.

It is understood from the equation (1) that, as the PWM period Tc becomes long, a decrease amount ΔVdwn from the DC voltage Vdc decreases, the upper limit value Vup increases and approaches the DC voltage Vdc. If the upper limit value Vup increases, the decrease amount of torque and the increase amount of current by the upper limitation of voltage command value decrease.

Then, when it is determined that the short circuit failure occurred, the PWM control unit 34 lengthens the PWM period Tc longer than when it is not determined that the short circuit failure occurred. According to this configuration, the upper limit value Vup can be increased more than when the PWM period Tc is not lengthened, and the decrease amount of torque and the increase amount of current by the upper limitation of voltage command value can be decreased.

For example, the PWM period Tc at the normal time is set to 50 microseconds, and the PWM period Tc at the failure time is set to 250 microseconds. An on period Ton of the negative electrode side switching device necessary for current detection is 5 microseconds. If the PWM period Tc at the failure time is set to 50 microseconds without changing from the normal time, the decrease amount ΔVdwn is 10% of the DC voltage Vdc. But, if the PWM period Tc at the failure time is lengthened from the normal time and is set to 250 microseconds, the decrease amount ΔVdwn becomes 2% of the DC voltage Vdc. Accordingly, compared with when the PWM period Tc at the failure time is not changed from the normal time, the decrease amount of torque and the increase amount of current can be decreased to ⅕.

As the PWM period Tc becomes long, the decrease amount of torque and the increase amount of current can be reduced. On the other hand, the sampling period of current changes in proportion to the PWM period Tc. If the sampling frequency of current decreases, Nyquist frequency decreases. Accordingly, if the PWM period Tc is lengthened too much, the stability of the current feedback control system will be deteriorated.

Then, the PWM period Tc (the sampling period of current) is set shorter than the response time constant of the control system which controls current flowing through the winding. The response time constant is defined as a time after performing step change of the current command value until the current detection value reaches 63.2% of the final value. The response time constant corresponds to a reciprocal of a cutoff frequency of the current feedback control system.

According to this configuration, since the PWM period Tc (sampling period of current) is set shorter than the response time constant, the current feedback control system can be prevented from being destabilized.

5. Embodiment 5

Figure 11:
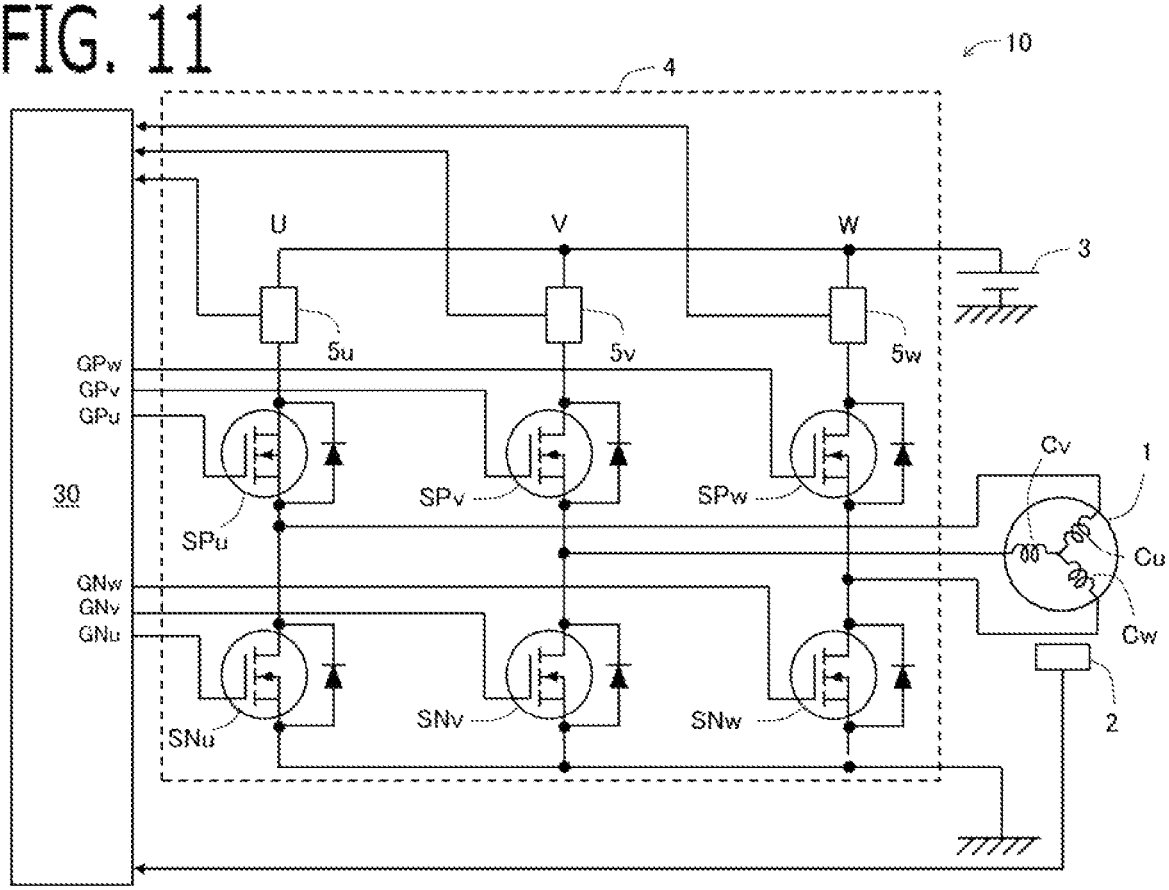
FIG. 11 is a schematic configuration diagram of the AC rotary machine and the controller for AC rotary machine according to Embodiment 5.

The controller 10 according to Embodiment 5 will be explained. The explanation for constituent parts the same as those in Embodiment 1 will be omitted. The basic configuration of the AC rotary machine 1 and the controller 10 according to the present embodiment is the same as that of Embodiment 1. Embodiment 5 is different from Embodiment 1 in that the current sensor is connected in series to the positive electrode side switching device, and the detection object device is the positive electrode side switching device. FIG. 11 is a schematic configuration diagram of the AC rotary machine 1 and the controller 10 according to the present embodiment.

The current sensor 5 of each phase is connected in series to the positive electrode side of the positive electrode side switching device SP of each phase. The current sensor 5 of each phase may be connected in series to the negative electrode side of the positive electrode side switching device SP of each phase. Accordingly, the current sensor 5 of each phase can detect the current which flows through the positive electrode side switching device SP of each phase.

<Lower Limit Value Vdwn of Voltage Command Value for Current Detection>

Figure 12:
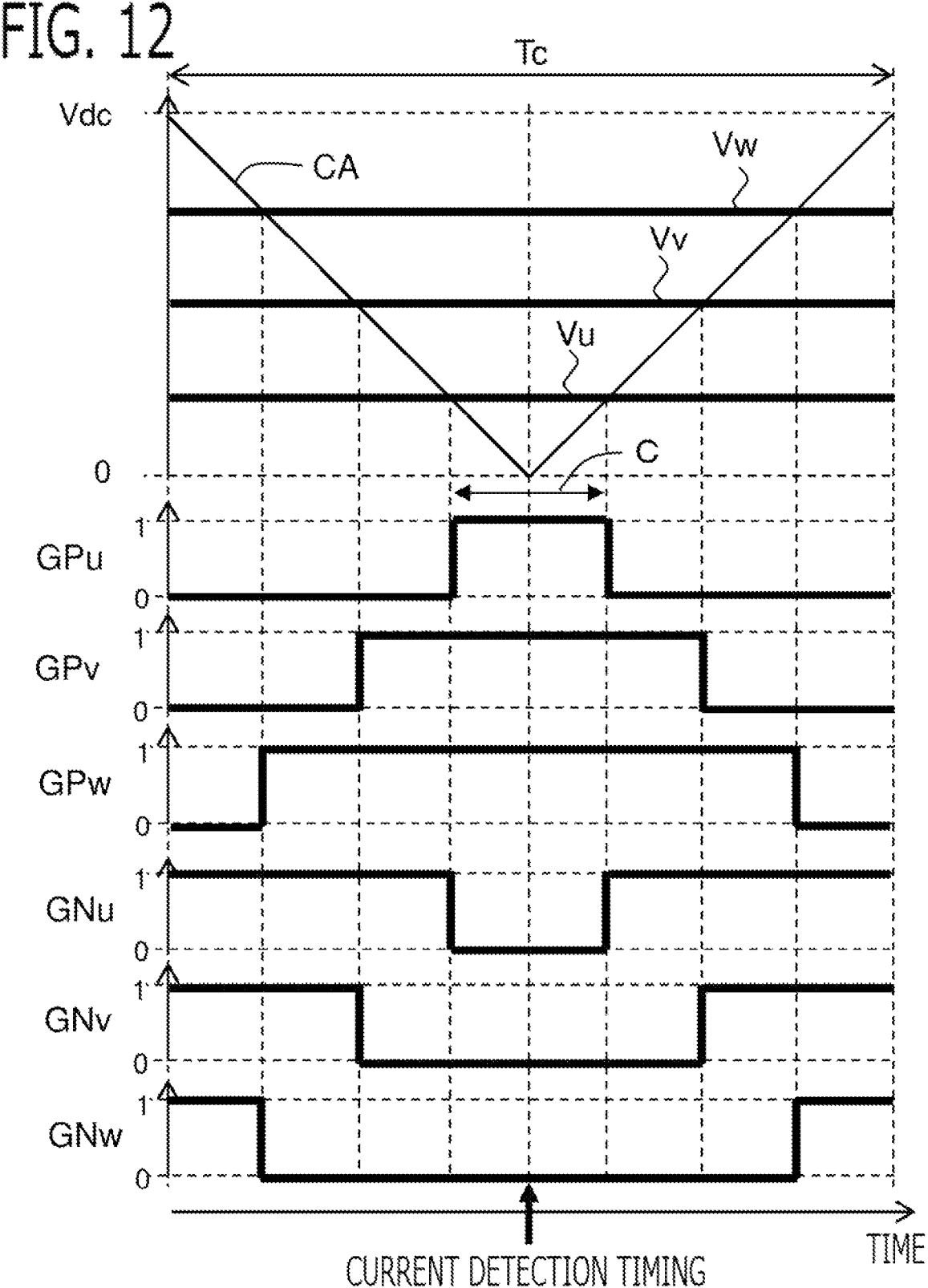
FIG. 12 is a time chart for explaining the PWM control and the current detection timing according to Embodiment 5.

In the present embodiment, as shown in FIG. 12, in the interval C centering on the peak point of valley of the carrier wave CA, the positive electrode side switching signals GPu, GPv, GPw of all three-phase are turned on. In this interval C, currents which flow into the three-phase windings can be detected by the current sensor 5. In the present embodiment, the current detection unit 32 detects current at the timing of the peak point of valley of the carrier wave CA.

In order to detect current of each phase, it is necessary to turn on the positive electrode side switching device of each phase. However, since the positive electrode side switching device is always turned off if the voltage command value coincides with 0, current cannot be detected by the current sensor 5.

On the other hand, since the positive electrode side switching device is turned on if the voltage command value is set larger than 0, current can be detected by the current sensor. However, since current cannot be detected correctly if the on period of the positive electrode side switching device is too short, it is necessary to set the on period of the positive electrode side switching device longer than or equal to the length necessary for current detection. This is because there is a stabilization time delay Tdly until current which flows through the positive electrode side switching device is stabilized, due to influence of ringing and the like, after turning on the positive electrode side switching device. Accordingly, current cannot be detected correctly, if current is detected before the stabilization time delay Tdly elapses after turning on the positive electrode side switching device.

In the present embodiment, since the center of the on period of the positive electrode side switching device becomes the current detection timing, it is necessary to set the on period of the positive electrode side switching device to a double value of the stabilization time delay Tdly or more. The double value of stabilization time delay Tdly corresponds to the length necessary for current detection. Accordingly, until the on period Ton of the positive electrode side switching device becomes the double value of stabilization time delay Tdly, the voltage command value needs to be increased by an increase amount ΔVup from 0.

In the present embodiment, the increase amount ΔVup and the lower limit value Vdwn of voltage command value necessary for current detection becomes the next equation. The increase amount ΔVup may be set with a margin considering variation. If the short circuit prevention period mentioned above is provided, the increase amount ΔVup is set considering the short circuit prevention period.

$$Ton = Tdly \times 2$$

$$\Delta Vup = Ton/Tc \times Vdc$$

$$Vdwn = 0 + \Delta Vup \quad (2)$$

For example, if the on period Ton of the negative electrode side switching device necessary for current detection is 5 microseconds and the PWM period Tc is 50 microseconds, the increase amount ΔVup becomes 10% of the DC voltage Vdc, and the lower limit value Vdwn is set to 10% of the DC voltage Vdc.

<Lower Limitation of Voltage Command Values of Normal Two Phases>

Figure 13:
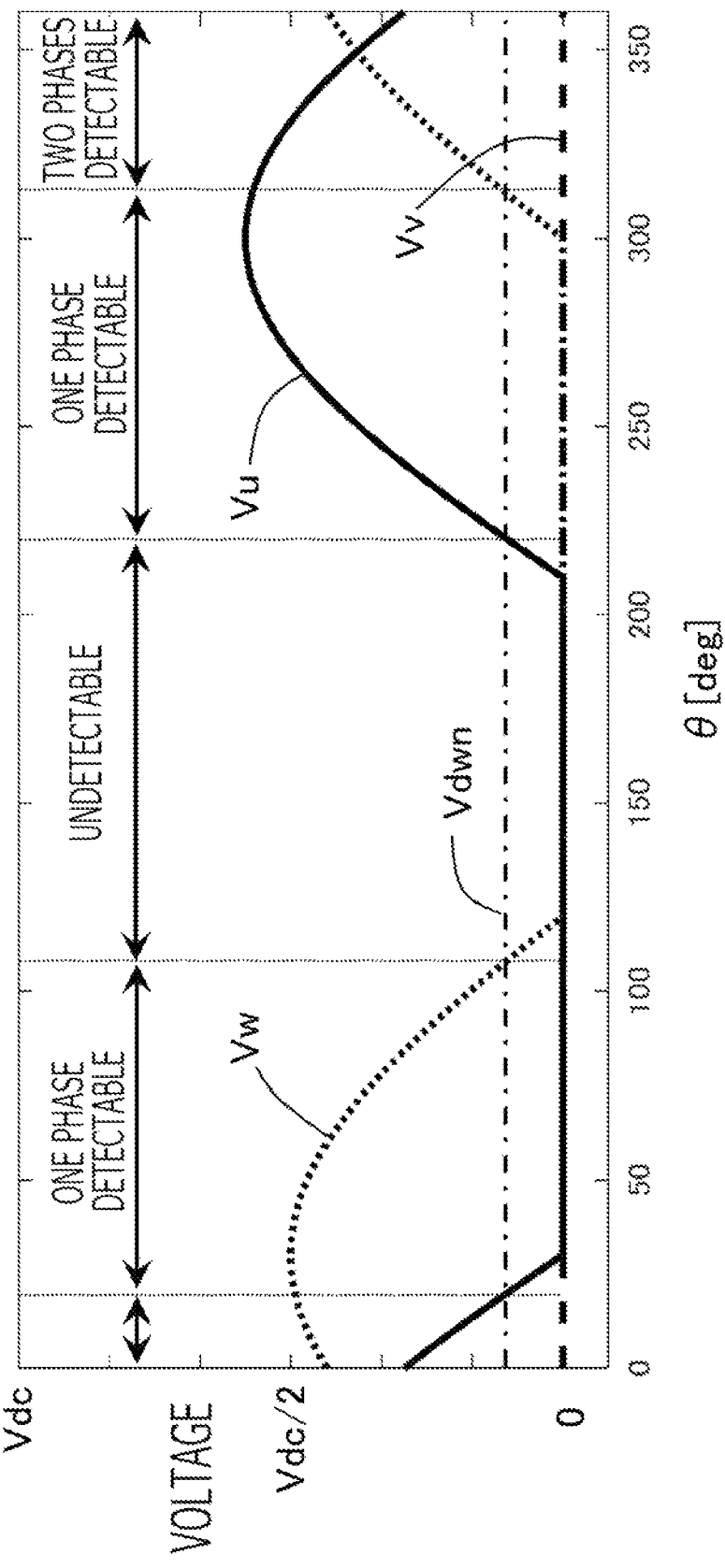
FIG. 13 is a time chart for explaining calculation of the voltage command values at occurrence of the negative electrode side short circuit failure of V phase according to Embodiment 5.

As shown in FIG. 13 similar to FIG. 13, at the time of the positive electrode side short circuit failure, there is an interval where one or both of the voltage command values of the normal two phases coincide with 0. Accordingly, the on period of the negative electrode side switching device of the normal two phases becomes short, and it becomes impossible to detect current by the current sensor.

In FIG. 13, there is the angle interval where current of normal one phase or two phases can be detected. But, if the torque command value To becomes small, amplitudes of the voltage command values of the normal two phases become small, and there is no angle interval where current of normal one phase or two phases can be detected, in all angle intervals.

Then, the voltage command calculation unit 332 changes the voltage command values of the normal two phases so that on period of the positive electrode side switching device of each phase of the normal two phases become longer than or equal to a length necessary for current detection at least at a current detection timing.

In the present embodiment, the detection object device is the positive electrode side switching device. When it is determined that the short circuit failure occurred, the failure time calculation unit 332 lower-limits the voltage command values of the normal two phases by the lower limit value Vdwn which is set to a value larger than 0 so that the on period of the positive electrode side switching device of each phase of the normal two phases becomes longer than or equal to the length necessary for current detection. The lower limit value Vdwn is set as explained using the equation (2).

According to this configuration, the on periods of the positive electrode side switching devices of the normal two phases can be set longer than or equal to the length necessary for current detection, and currents of the normal two phases can be detected with good accuracy. If the lower limit value Vdwn is set so that the on period of the positive electrode side switching device becomes the minimum length necessary for current detection, influence on the voltage command values of the normal phases can be minimized, and influence on the current control and the torque control can be suppressed.

In the lower limitation by the lower limit value Vdwn, only the voltage command value which is below the lower limit value Vdwn may be set to the lower limit value Vdwn; or the voltage command values of the normal two phases may be increased by the same offset voltage so that the voltage command values of the normal two phases are not below the lower limit value Vdwn.

For the purposes, such as detection of failure of the current sensor, and correction of the output signal of the current sensor, the current detection unit 32 may detect the output signal of the current sensor at the timing when current is not flowing into the current sensor. In this case, when it is determined that the short circuit failure occurred, the failure time calculation unit 332 may upper-limit the voltage command values of the normal two phases by an upper limit value which is set to a value smaller than the DC voltage Vdc so that the off period of the positive electrode side switching device of each phase of the normal two phases may be generated. Especially, when it is determined that the positive electrode side short circuit failure occurred, since the voltage command values of the normal two phases vibrate on the basis of the DC voltage Vdc, the frequency of becoming the DC voltage Vdc becomes high, and it is necessary to upper-limit by the upper limit value. In the case of upper-limiting by the upper limit value, the current detection unit 32 may detect the output signal of the current sensor at the peak point of mountain of the carrier wave CA.

Even in the present embodiment, similarly to Embodiment 2, when it is determined that the short circuit failure occurred, the voltage command value calculation unit 33 may calculate the voltage command values of the normal two phases, based on the current detection values of the normal two phases.

Even in the present embodiment, similar to Embodiment 3, when it is determined that the short circuit failure occurred, the current detection unit 32 may detect current at the peak point of valley of the carrier wave CA of every a plurality of PWM periods. When it is determined that the short circuit failure occurred, the voltage command calculation unit 332 may changes the voltage command values of the normal two phases so that the on period of the positive electrode side switching device of each phase of the normal two phases become longer than or equal to the length necessary for current detection at the current detection timing of every the plurality of PWM periods.

Even in the present embodiment, similar to Embodiment 4, when it is determined that the short circuit failure occurred, the PWM control unit 34 may lengthen the PWM period Tc longer than when it is not determined that the short circuit failure occurred.

6. Embodiment 6

Figure 14:
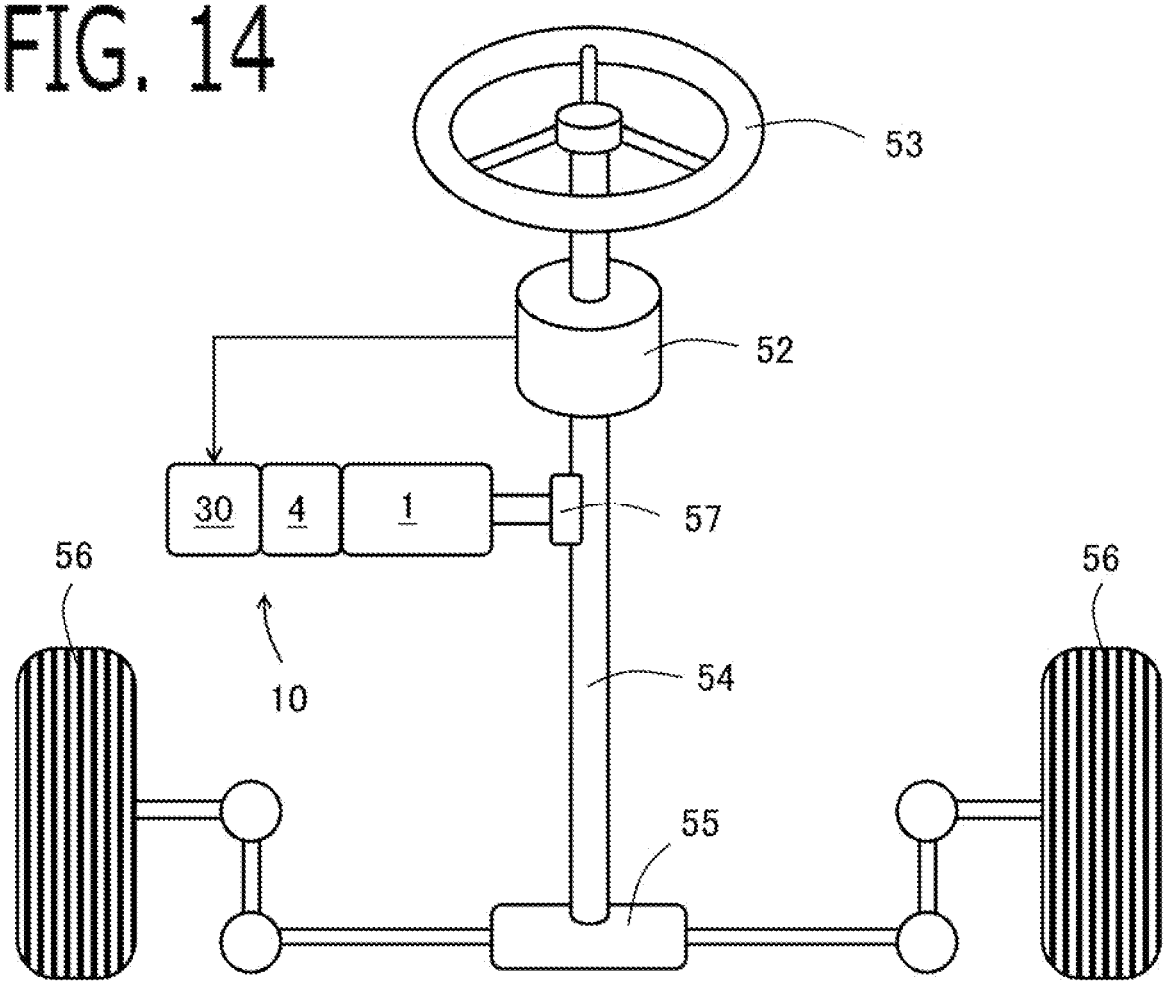
FIG. 14 is a schematic configuration diagram of the electric power steering apparatus, the AC rotary machine, and the controller for AC rotary machine according to Embodiment 6.

The controller 10 according to Embodiment 6 will be explained. The explanation for constituent parts the same as those in Embodiment 1 will be omitted. The basic configuration of the AC rotary machine 1 and the controller 10 according to the present embodiment is the same as that of Embodiment 1. Embodiment 6 is different from Embodiment 1 in that the AC rotary machine 1 is a driving force source of an electric power steering apparatus. FIG. 14 is a schematic configuration diagram of the electric power steering apparatus, the AC rotary machine 1, and the controller 10 according to the present embodiment.

The electric power steering apparatus is provided with a handle 53 that a driver rotates right and left, a shaft 54 that is connected with the handle 53 and transmits a steering torque by the handle 53 to a steering mechanism 55 of wheels 56, a torque sensor 52 that is attached to the shaft 54 and detects the steering torque by the handle 53, a driving force transmission mechanisms 57, such as a worm gear mechanism, that transmits a driving force of the AC rotary machine 1 to the shaft 54, and the steering mechanism 55, such as a rack pinion gear, that steers the wheels 56 by a driving force of the shaft 54. An output signal of the torque sensor 52 is inputted into the control device 30.

The control device 30 (the voltage command value calculation unit 33) detects the steering torque of the handle 53 based on the output signal of the torque sensor 52, and calculates the torque command value To (or the torque current command value) based on the steering torque.

In this kind electric power steering apparatus, by configuring like Embodiments 1 to 5, currents of the normal two phases can be detected when the short circuit failure occurred. And, even when the short circuit failure occurred, the AC rotary machine 1 can generate torque according to the torque command value To. Based on the current detection values of the normal two phases, the short circuit failure of the normal two phases can be determined and the AC rotary machine 1 can generate the torque according to the torque command value To by current feedback control.

Other Embodiments

Other embodiments of the present disclosure will be described. Each of the configurations of embodiments to be explained below is not limited to be separately utilized but can be utilized in combination with the configurations of other embodiments as long as no discrepancy occurs.

(1) In each of the above-mentioned Embodiments, there has been explained the case where one pair of the three-phase windings is provided, one pair of inverter is provided, and the control device 30 is configured corresponding to one pair of the three-phase windings and the inverter. However, plural pairs (for example, two pairs) of the three-phase windings and inverters may be provided. In this case, the AC rotary machine 1 (stator) is provided with windings of phase number of 3× the number of pairs. The control device 30 may be provided with plural pairs of the control units 31 to 35 corresponding to each pair of the three-phase windings and the inverter; or plural pairs of the control devices 30 may be provided.

(2) In each of the above-mentioned Embodiments, there has been explained the case where the AC rotary machine 1 is provided with the three-phase windings. However, the AC rotary machine 1 may be provided with the two-phase windings, or may be provided with windings of four-phase or more. The inverter and the control device are appropriately designed according to the phase number.

(3) In the above Embodiment 6, there was explained the case where the AC rotary machine 1 is the driving force source of the electric power steering apparatus. However, the AC rotary machine 1 may be a driving force source of various kinds of apparatus, such as a driving force source of wheel.

(4) In each of the above-mentioned Embodiments, there has been explained the case where the voltage command values and the carrier wave change between 0 and the DC voltage Vdc, centering on the half value of the DC power source Vdc. However, the voltage command values and the carrier wave may change between a value (−Vdc/2) obtained by multiplying −1 to the half value of the DC voltage Vdc and the half values (Vdc/2) of the DC voltage Vdc, centering on 0. In this case, in each processing of the voltage command value calculation unit, the voltage command value is offset by the half value of the DC voltage Vdc in the negative side.

Although the present disclosure is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations to one or more of the embodiments. It is therefore understood that numerous modifications which have not been exemplified can be devised without departing from the scope of the present disclosure. For example, at least one of the constituent components may be modified, added, or eliminated. At least one of the constituent components mentioned in at least one of the preferred embodiments may be selected and combined with the constituent components mentioned in another preferred embodiment.

REFERENCE SIGNS LIST

1: AC Rotary Machine, 2: Rotation Sensor, 3: DC power Source, 4: Inverter, 5: Current Sensor, 10: Controller for AC Rotary Machine, 30: Control device, 31: Rotation Detection Unit, 32: Current Detection Unit, 33: Voltage Command Value Calculation Unit, 34: PWM Control Unit, 35: Failure Determination Unit, CA: Carrier wave, SP: Positive electrode side switching device, SN: Negative electrode side switching device, Tc: Control period of PWM control (PWM period), Ton: On period of switching device, Vdc: DC Voltage, Vdwn: Lower limit value, Vup: Upper limit value

What is claimed is:

1. A controller for AC rotary machine that controls an AC rotary machine which is provided with n-phase windings (n is a natural number of greater than or equal to three), the controller for AC rotary machine comprising:

an inverter that is provided with n sets of series circuits in each of which a positive electrode side switching device connected to a positive electrode side of a DC power source and a negative electrode side switching device connected to a negative electrode side of the DC power source are connected in series and a connection node of series connection is connected to the winding of the corresponding phase, corresponding to each phase of n-phase;

n-phase current sensors each of which is connected in series to a detection object device which is the positive electrode side switching device or the negative electrode side switching device of each phase of n-phase, and detects current;

a voltage command value calculator that calculates a voltage command value of each phase applied to the winding of each phase;

a PWM controller that controls on/off the switching devices of each phase by PWM control, based on the voltage command value of each phase;

a current detector that detects current of each phase, based on an output signal of the current sensor of each phase, at a timing when the detection object device of each phase is turned on; and a failure determiner that determines a positive electrode side short circuit failure which is a short circuit failure of a part of the positive electrode side switching device, and a negative electrode side short circuit failure which is a short circuit failure of a part of the negative electrode side switching device, in the series circuit of each phase of the inverter, wherein, when it is determined that the positive electrode side short circuit failure or the negative electrode side short circuit failure of the series circuit of any one phase occurred, the voltage command value calculator calculates the voltage command values of normal n−1 phases that the short circuit failure does not occur; and changes the voltage command values of the normal n−1 phases so that on period of the detection object device of each phase of the normal n−1 phases become longer than or equal to a length necessary for current detection at least at a current detection timing.

2. The controller for AC rotary machine according to claim 1,
wherein, in a case where the detection object device is the negative electrode side switching device, when it is determined that the short circuit failure occurred, the PWM controller upper-limits the voltage command values of the normal n−1 phases by an upper limit value which is set to a value smaller than a DC voltage of the DC power source so that the on period of the negative electrode side switching device of each phase of the normal n−1 phases becomes longer than or equal to the length necessary for current detection; and
in a case where the detection object device is the positive electrode side switching device, when it is determined that the short circuit failure occurred, the PWM controller lower-limits the voltage command values of the normal n−1 phases by a lower limit value which is set to a value larger than 0 so that the on period of the positive electrode side switching device of each phase of the normal n−1 phases becomes longer than or equal to the length necessary for current detection.

3. The controller for AC rotary machine according to claim 1,
wherein the current detection unit detector detects current for every a plurality of control periods of the PWM control, and
wherein the voltage command value calculator changes the voltage command values of the normal n−1 phases so that the on period of the detection object device of each phase of the normal n−1 phases becomes longer than or equal to the length necessary for current detection, at a current detection timing of every the plurality of control periods of the PWM control.

4. The controller for AC rotary machine according to claim 3,
wherein the plurality of control periods of the PWM control for detecting current is shorter than a response time constant of a control system which controls current flowing through the winding.

5. The controller for AC rotary machine according to claim 3,
wherein the current detector calculates a current detection value, based on the plurality of past current detection values, at the control period of the PWM control when current is not detected.

6. The controller for AC rotary machine according to claim 1,
wherein, when it is determined that the short circuit failure occurred, the PWM controller lengthens the control period of the PWM control more than when it is not determined that the short circuit failure occurred.

7. The controller for AC rotary machine according to claim 1,
wherein, when it is determined that the positive electrode side short circuit failure occurred, the voltage command value calculator sets the voltage command value of abnormal phase in which the short circuit failure occurred, to a DC voltage of the DC power source, and calculates the voltage command values of the normal n−1 phases which vibrate on a basis of the DC voltage of the DC power source according to a rotational angle of the AC rotary machine; and
when it is determined that the negative electrode side short circuit failure occurred, the voltage command value calculator sets the voltage command value of abnormal phase in which the short circuit failure occurred, to 0, and calculates the voltage command values of the normal n−1 phases which vibrate on a basis of 0 according to the rotational angle of the AC rotary machine.

8. The controller for AC rotary machine according to claim 1,
wherein, when it is determined that the short circuit failure occurred, the voltage command value calculator calculates basic values of voltage command value of the normal n−1 phases which vibrate on a basis of a half value of a DC voltage of the DC power source according to a rotational angle of the AC rotary machine;
when it is determined that the positive electrode side short circuit failure occurred, the voltage command value calculator sets the voltage command value of abnormal phase in which the short circuit failure occurred, to the DC voltage of the DC power source, and makes the basic values of voltage command value of the normal n−1 phases offset in a positive direction by the half value of the DC voltage of the DC power source; and
when it is determined that the negative electrode side short circuit failure occurred, the voltage command value calculator sets the voltage command value of abnormal phase in which the short circuit failure occurred, to 0, and makes the basic values of voltage command value of the normal n−1 phases offset in a negative direction by the half value of the DC voltage of the DC power source.

9. The controller for AC rotary machine according to claim 1,
wherein the failure determiner determines failure of the series circuit of each phase of the normal n−1 phases, based on current detection values of the normal n−1 phases.

10. The controller for AC rotary machine according to claim 1,
wherein, when it is determined that the short circuit failure occurred, the voltage command value calculator calculates the voltage command values of the normal n−1 phases, based on current detection values of the normal n−1 phases.

11. The controller for AC rotary machine according to claim 1,
wherein the failure determiner determines, about each phase, that the positive electrode side short circuit failure occurred, when determining that a short circuit failure in which the positive electrode side switching device always turns on, or a short circuit failure in which a connection path between the series circuit and the winding short-circuits to a positive electrode side of the DC power source occurred; and
determines, about each phase, that the negative electrode side short circuit failure occurred, when determining that a short circuit failure in which the negative electrode side switching device always turns on, or a short circuit failure in which a connection path between the series circuit and the winding short-circuits to a negative electrode side of the DC power source occurred.

12. The controller for AC rotary machine according to claim 1,
wherein the PWM controller compares the voltage command value of each phase with a carrier wave which vibrates between 0 and a DC voltage of the DC power source at a control period of the PWM control, and controls on/off the switching devices of each phase, based on a comparison result.

13. The controller for AC rotary machine according to claim 1,
  wherein the AC rotary machine is a driving force source of an electric power steering apparatus.

* * * * *